Nov. 14, 1967 A. CUTAIA 3,352,417

DOCUMENT SORTING APPARATUS

Filed Sept. 4, 1963 10 Sheets-Sheet 1

INVENTOR
ALFRED CUTAIA
BY Donald F Voss
ATTORNEY

Nov. 14, 1967 A. CUTAIA 3,352,417

DOCUMENT SORTING APPARATUS

Filed Sept. 4, 1963

10 Sheets-Sheet 3

| POCKET NUMBER | 1 | 2 | 4 | 8 |
|---|---|---|---|---|
| 1 | 1 | 1 | 1 | 1 |
| 2 | 0 | 1 | 1 | 1 |
| 3 | 1 | 0 | 1 | 1 |
| 4 | 0 | 0 | 1 | 1 |
| 5 | 1 | 1 | 0 | 1 |
| 6 | 0 | 1 | 1 | 0 |
| 7 | 1 | 0 | 1 | 0 |
| 8 | 0 | 0 | 1 | 0 |
| 9 | 1 | 1 | 0 | 0 |
| 0 | 0 | 1 | 0 | 1 |
| 11 | 0 | 1 | 0 | 0 |
| 12 | 1 | 0 | 0 | 0 |

GRAY CODE COUNTER POSITION

| | CODE | | | |
|---|---|---|---|---|
| | X | A | B | C |
| 0 | 1 | 0 | 0 | 0 |
| 1 | 0 | 1 | 0 | 0 |
| 2 | 1 | 1 | 1 | 0 |
| 3 | 0 | 0 | 1 | 0 |
| 4 | 1 | 0 | 1 | 1 |
| 5 | 0 | 1 | 1 | 1 |
| 6 | 1 | 1 | 0 | 1 |
| 7 | 0 | 0 | 0 | 1 |

Nov. 14, 1967 A. CUTAIA 3,352,417

DOCUMENT SORTING APPARATUS

Filed Sept. 4, 1963 10 Sheets-Sheet 7

Nov. 14, 1967 A. CUTAIA 3,352,417

DOCUMENT SORTING APPARATUS

Filed Sept. 4, 1963 10 Sheets-Sheet 10

United States Patent Office 3,352,417 Patented Nov. 14, 1967

3,352,417
DOCUMENT SORTING APPARATUS

Alfred Cutaia, Rochester, Minn., assignor to International Business Machines Corporation, New York, N.Y., a corporation of New York Filed Sept. 4, 1963, Ser. No. 306,448
14 Claims. (Cl. 209—74)

ABSTRACT OF THE DISCLOSURE

A document sorter is provided with one bank of pockets disposed below another bank of pockets with six pockets in each bank. Documents are supported upon a platform and are fed from the top by a picker belt. There is a minimal document cycle which is defined as being equal to the maximum document length plus the minimum gap between documents, and this cycle is greater than the pocket pitch. The minimum gap between documents is equal to the maximum allowable designed slippage in the transport, plus the maximum pickup or dropout time of each pocket select magnet and the magnets for operating a deflector for selecting the documents into one of the two banks of pockets. A single character represented by a plurality of data bits designates the pocket into which an associated document is to be distributed. Documents are transported by a pair of endless belts. In a first embodiment, a first document detector located at a predetermined position within the document path develops a gating signal for controlling the transfer of the pocket selection character for the first document to a first group of registers. The first group of registers are so controlled that the first pocket selection character transfers to the register from which the pocket selection characters are read out. Subsequent pocket selection characters enter the registers in the sequence in which the documents are fed. Further, the pocket selection characters automatically propagate from one register to another toward the register from which the pocket selection characters are read out whenever a register position is empty.

When a first document reaches a second predetermined position within the transport path, as determined by a second document detector, the pocket selection character is transferred from the output register of the first group of registers to a first register of a second group of registers. The pocket selection character then transfers from register to register of the second group of registers under control of gray code counters which are advanced by pulses generated by an emitter operating in a time relationship with the movement of the documents. Decoding networks are connected to the registers of the second group of registers, and if the pocket selection character within a register satisfies the associated decoding network, a signal is passed by the network to a magnet driver. The magnet driver is operated to energize a magnet which actuates a pocket deflector for deflecting a document from the document path into a receiving stacker pocket.

In a second embodiment of the invention, the second document detector is eliminated. The pocket selection character entered into the first register of the first group of registers under control of the first document detector propagates from register to register of the first group of registers under control of counters which are operated by pulses from the emitter. Thus, the significant difference between the first and second embodiment resides in the apparatus for controlling the propagation of the pocket selection character from register to register of the first group of registers.

In a third embodiment of the invention, a single gray code counter is used to generate a sequence of discrete emitter numbers as impulses are generated by the emitter. The pocket selection character is entered into the first register of the first group of registers in the same manner as for the second embodiment of the invention. The discrete emitter number is entered into a tag register. There is a tag register for each pocket selection character register. The outputs from the tag register are continuously compared with the outputs from the gray code counter by means of a logical compare circuit. When there is a comparison between the emitter number in the tag register and that from the gray code counter, the compare circuit develops a signal which transfers the pocket selection character to the next adjacent register, and the emitter number in the tag register transfers to the next adjacent tag register. The decode circuits, magnet drivers and magnets are the same for the second and third embodiments as for the first embodiment.

This invention relates to document sorting apparatus and more particularly, to the apparatus for controlling the selection of documents into a plurality of receptacles.

In this invention, the document selection data is caused to track the associated document as it is transported. The selection data is examined by decoding networks as the document arrives at predetermined points in the document transport path. The decoding networks are connected to operate control magnets which in turn operate the document selection apparatus for diverting the documents into the receiving receptacles. The invention is applicable to apparatus where the documents are fed either synchronously or asynchronously. In the example given hereinafter, documents are fed asynchronously.

The decoding networks are distinct from each other and a signal will be passed by a particular decode network to operate the associated control magnets only when the document is destined for the receptacle associated with the particular decode network.

Accordingly, a prime object of the invention is to provide improved apparatus for controlling the selection of documents into a plurality of receptacles.

Another very important object of the invention is to provide document selection apparatus operable by document selection data which is caused to track the associated document as it is transported.

Still another very important object of the invention is to provide improved document selection apparatus which advances the document selection data in synchronism with the movement of the document, by developing advance impulses from the apparatus for transporting the documents.

Yet another important object of the invention is to provide document selection apparatus which can select documents without the use of chute blades and be able to do so even though the machine is stopped and started again.

Another object of the invention is to provide document selection apparatus which includes apparatus for selecting the documents into one of two transport paths and thereafter selecting the documents into one of a plurality of receptacles in each transport path.

A further object of the invention is to provide document selection apparatus where the documents are selected into one of two transport paths and thereafter into one of a plurality of receptacles within each transport path which time shares the document selection apparatus between the two transport paths.

Still another object of the invention is to provide document selection apparatus which is capable of checking to determine whether or not the documents were properly selected into the receiving receptacles.

Another object of the invention is to provide document selection apparatus which diverts the documents into the receiving receptacles without restoring the diverting apparatus on a time basis. The diverting apparatus is restored by the document selection data.

Yet another object is to provide improved document selection apparatus where the documents are fed either synchronously or asynchronously.

The foregoing and other objects, features and advantages of the invention will be apparent from the following more particular description of preferred embodiments of the invention, as illustrated in the accompanying drawings.

In the drawings:

FIG. 1 is a schematic diagram of a first embodiment which is a preferred embodiment illustrating the document transport paths and the document selection apparatus;

FIGS. 2*a* and 2*b*, with FIG. 2*b* disposed to the right of FIG. 2*a*, taken together are a schematic diagram showing in greater detail the data storage registers of FIG. 1 for storing the data selection characters and the controls for advancing the data selection characters from storage register to storage register;

Figure 1:
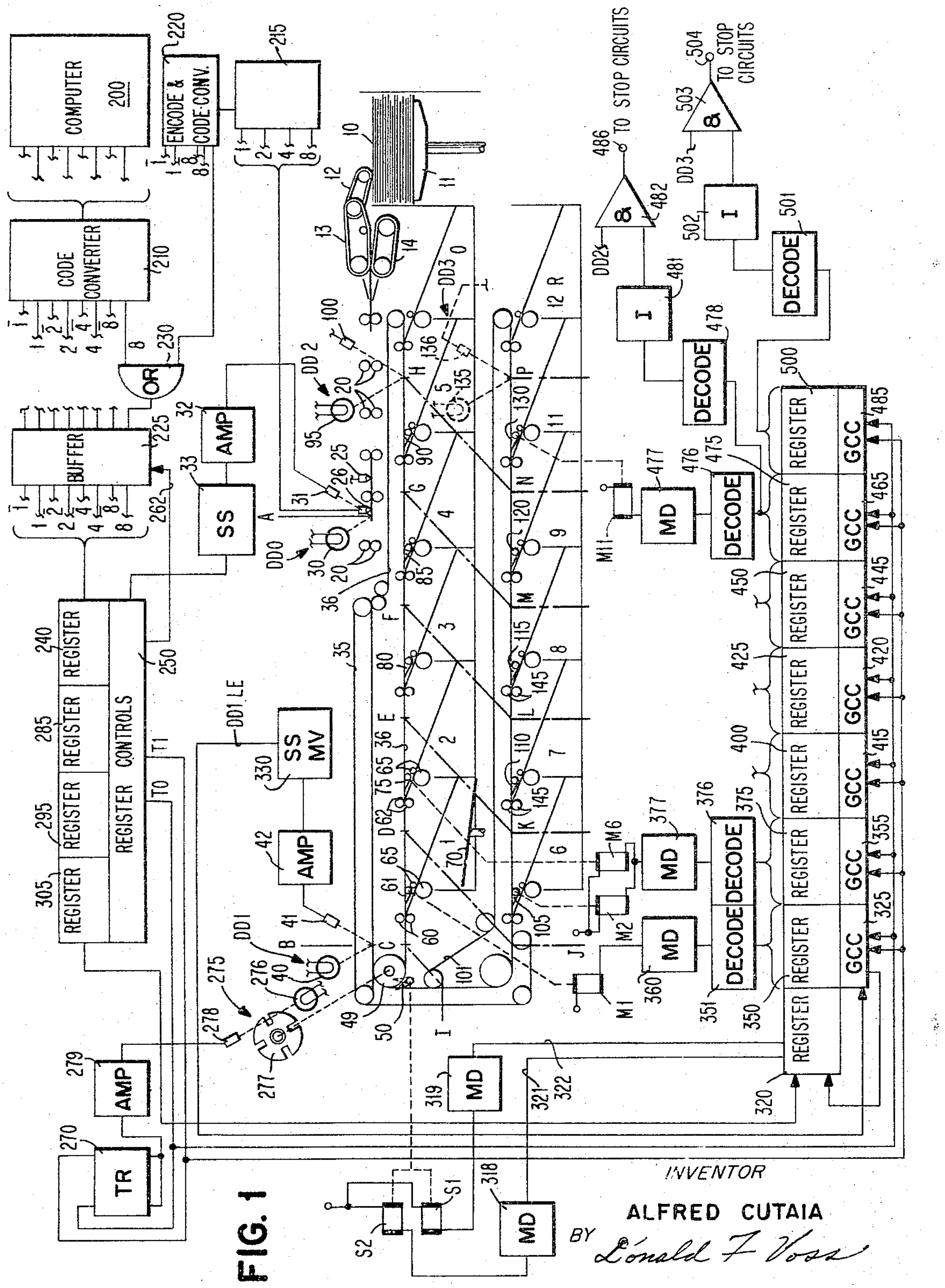
Figures 3, 4, 5:
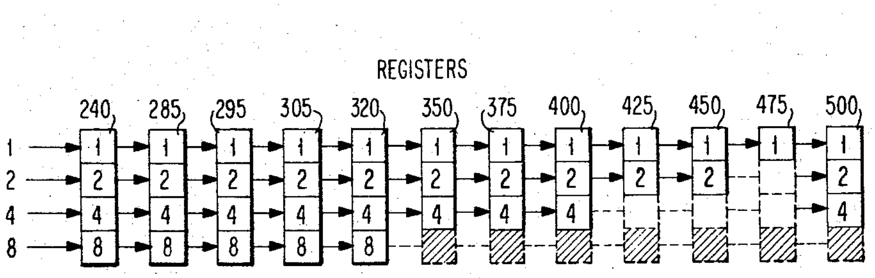
FIG. 3 is a code chart for representing the document selection characters which in this example are the numbers 1 through 12.
FIG. 4 is a chart illustrating a gray code for the gray counters.
Figure 6:
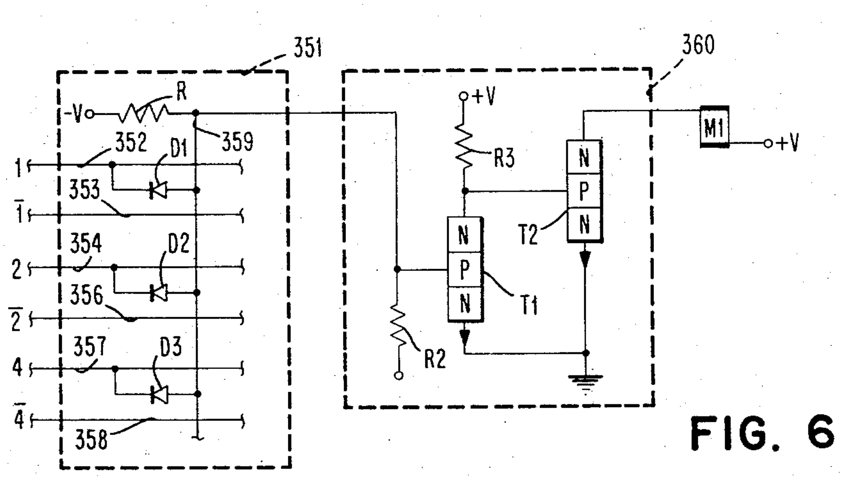
Figure 7:
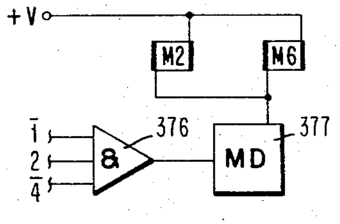
Figure 8:
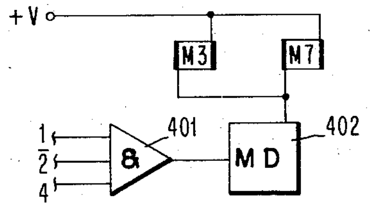
Figure 9:
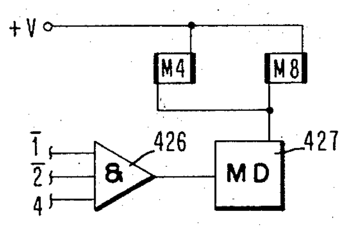
Figure 10:
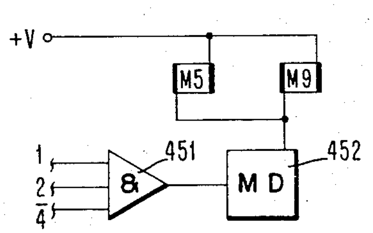
Figure 11:
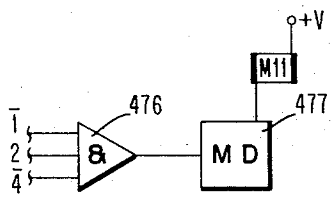
Figure 12:
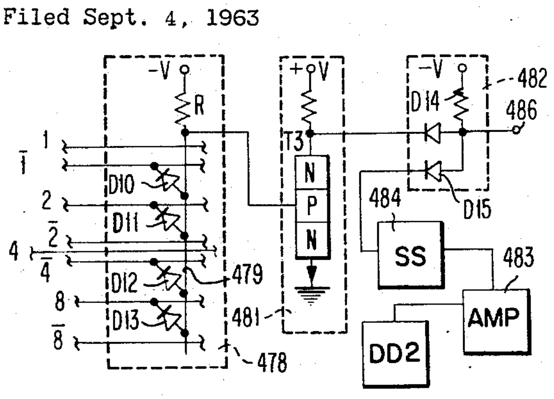
Figure 13:
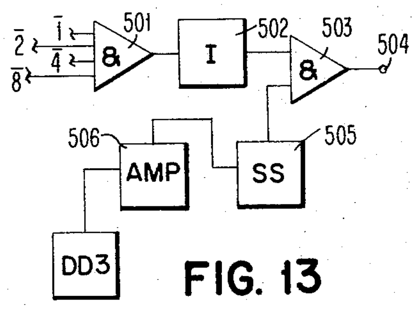
Figures 14, 15:
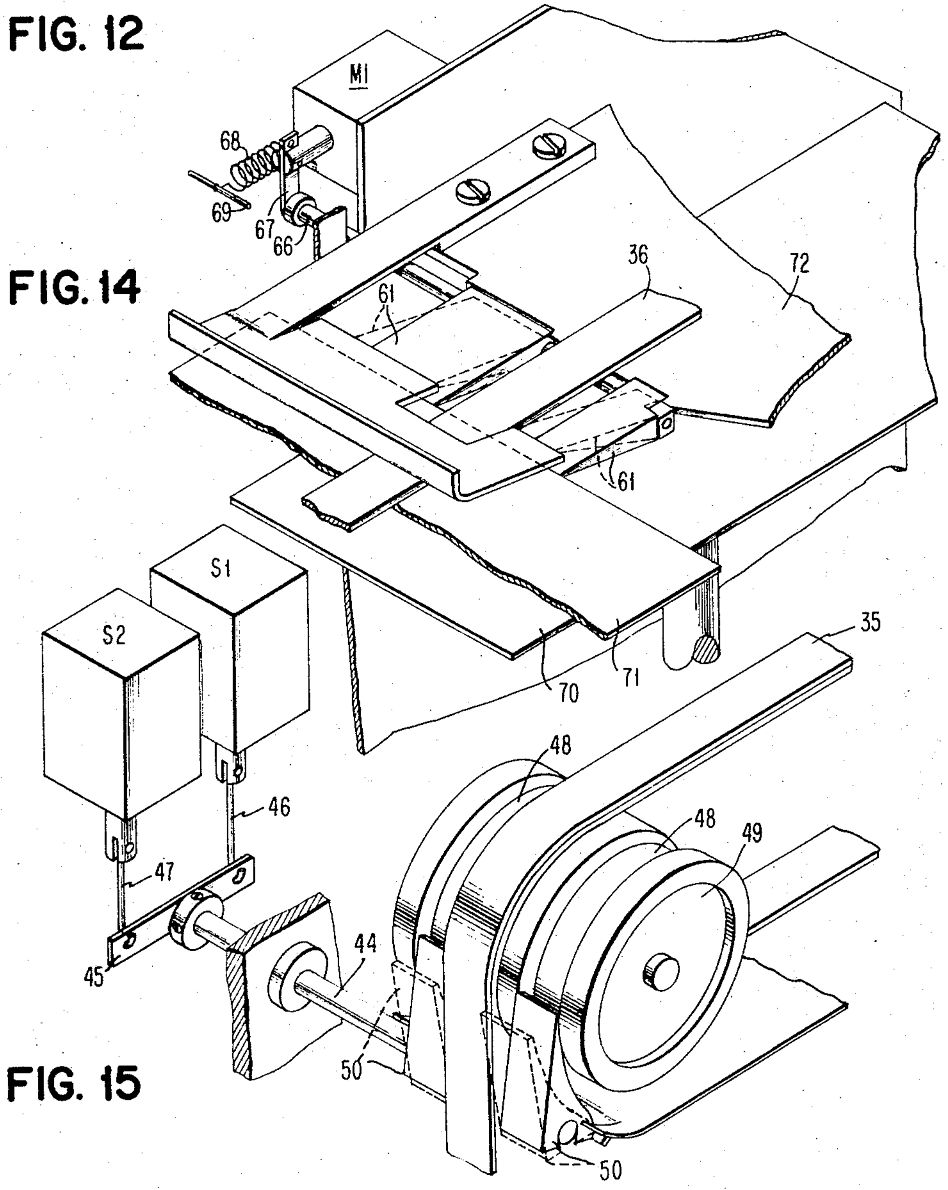
Figure 16:
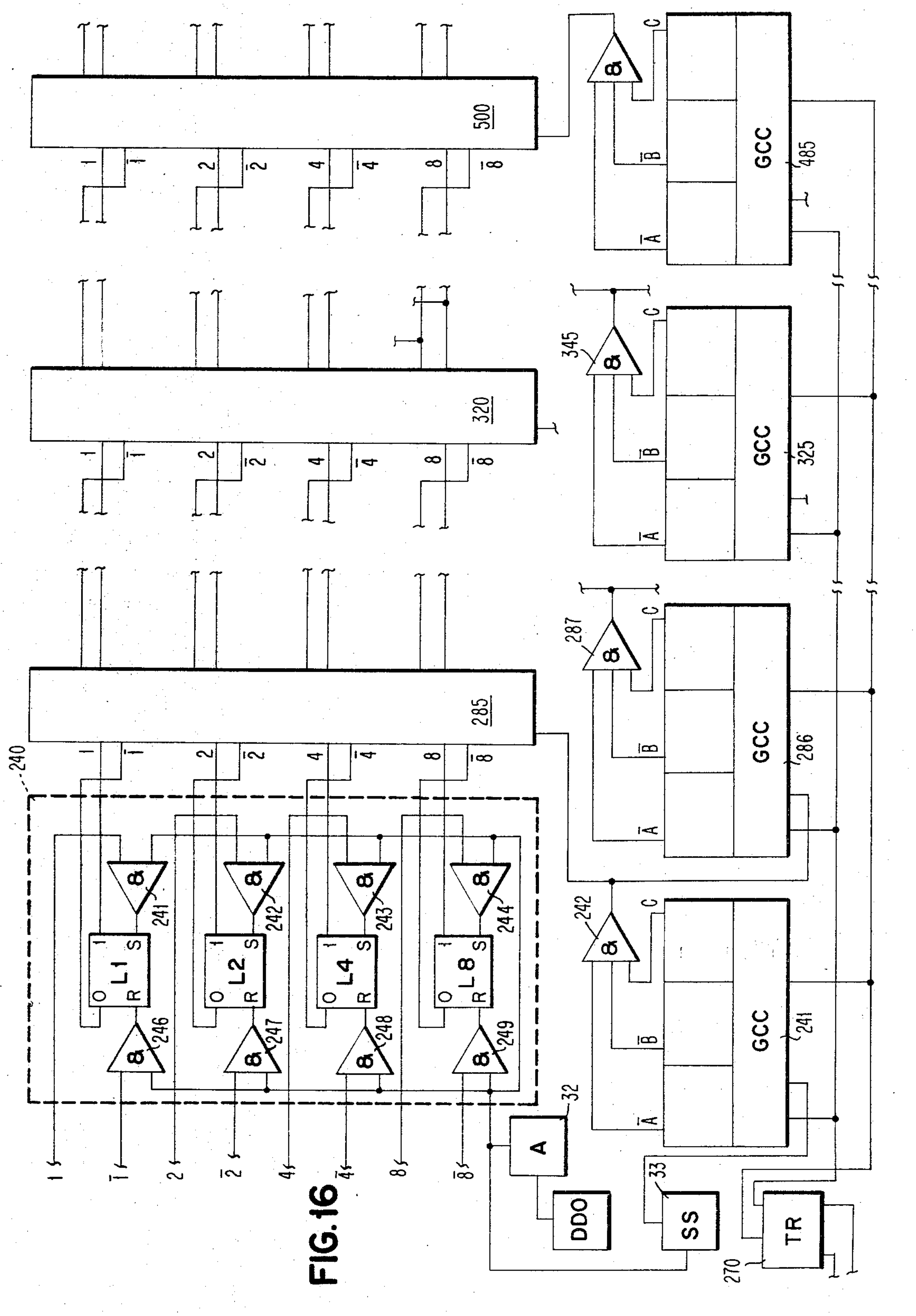
Figure 17:
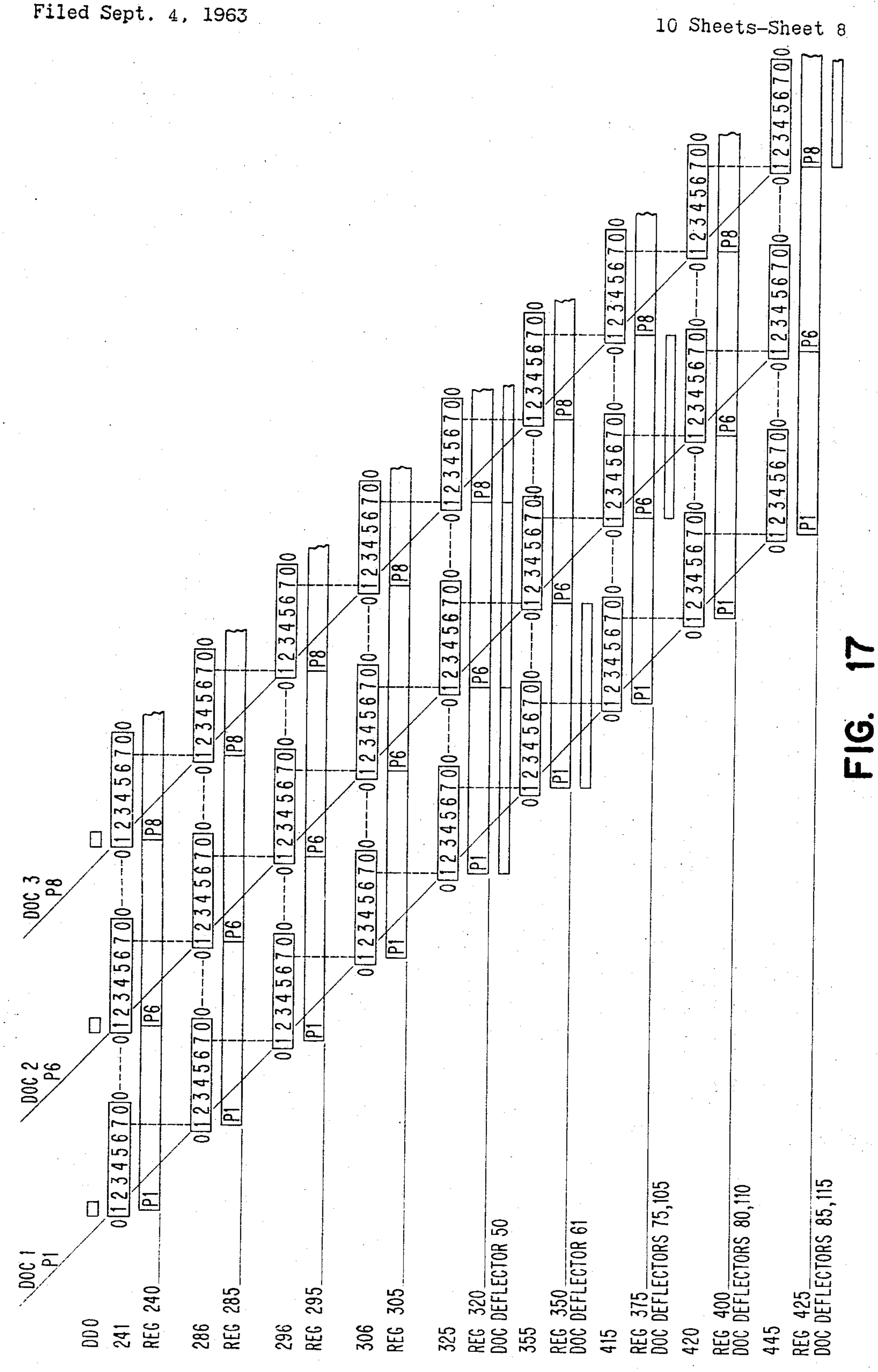
Figure 18A:
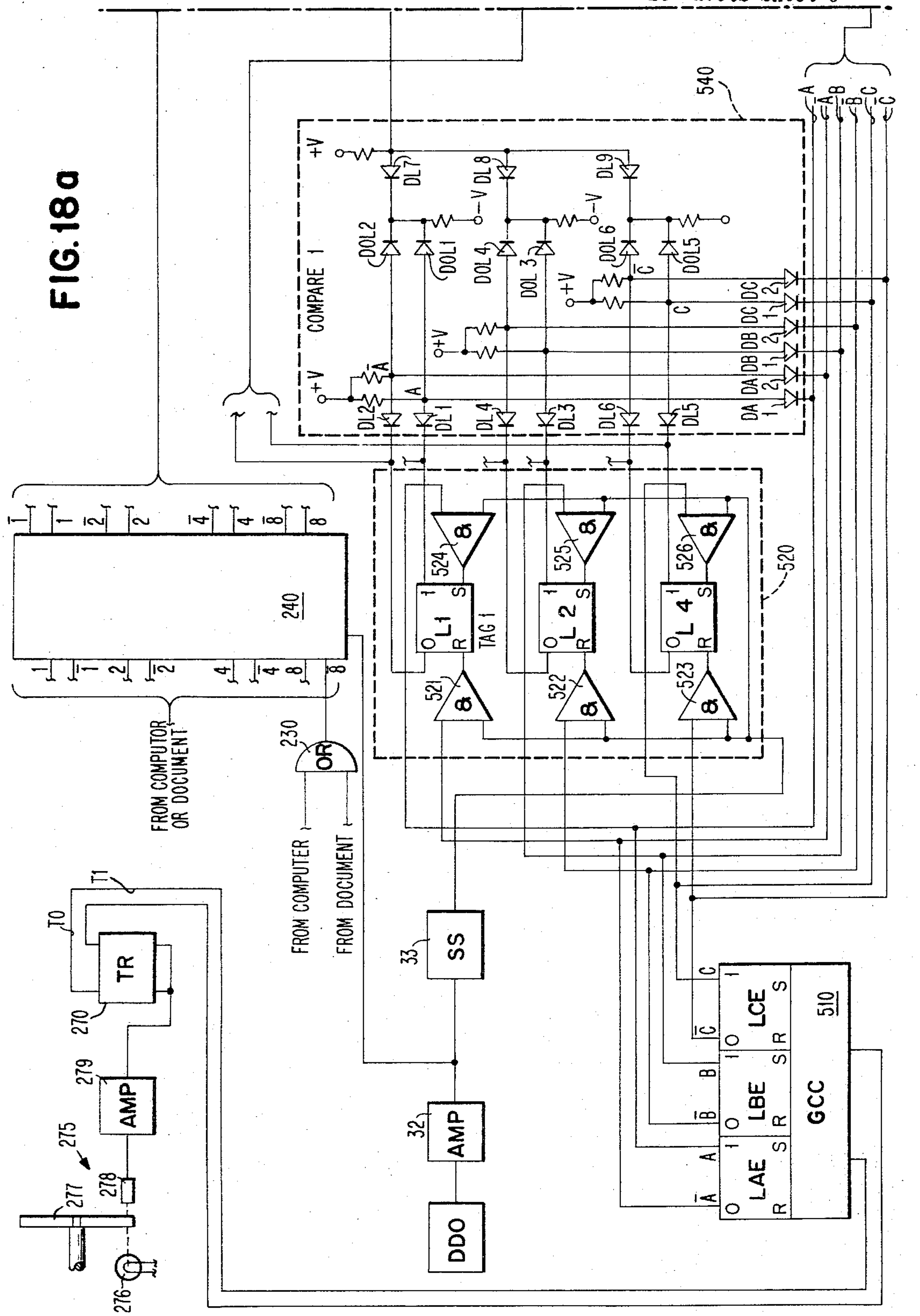
Figure 18B:
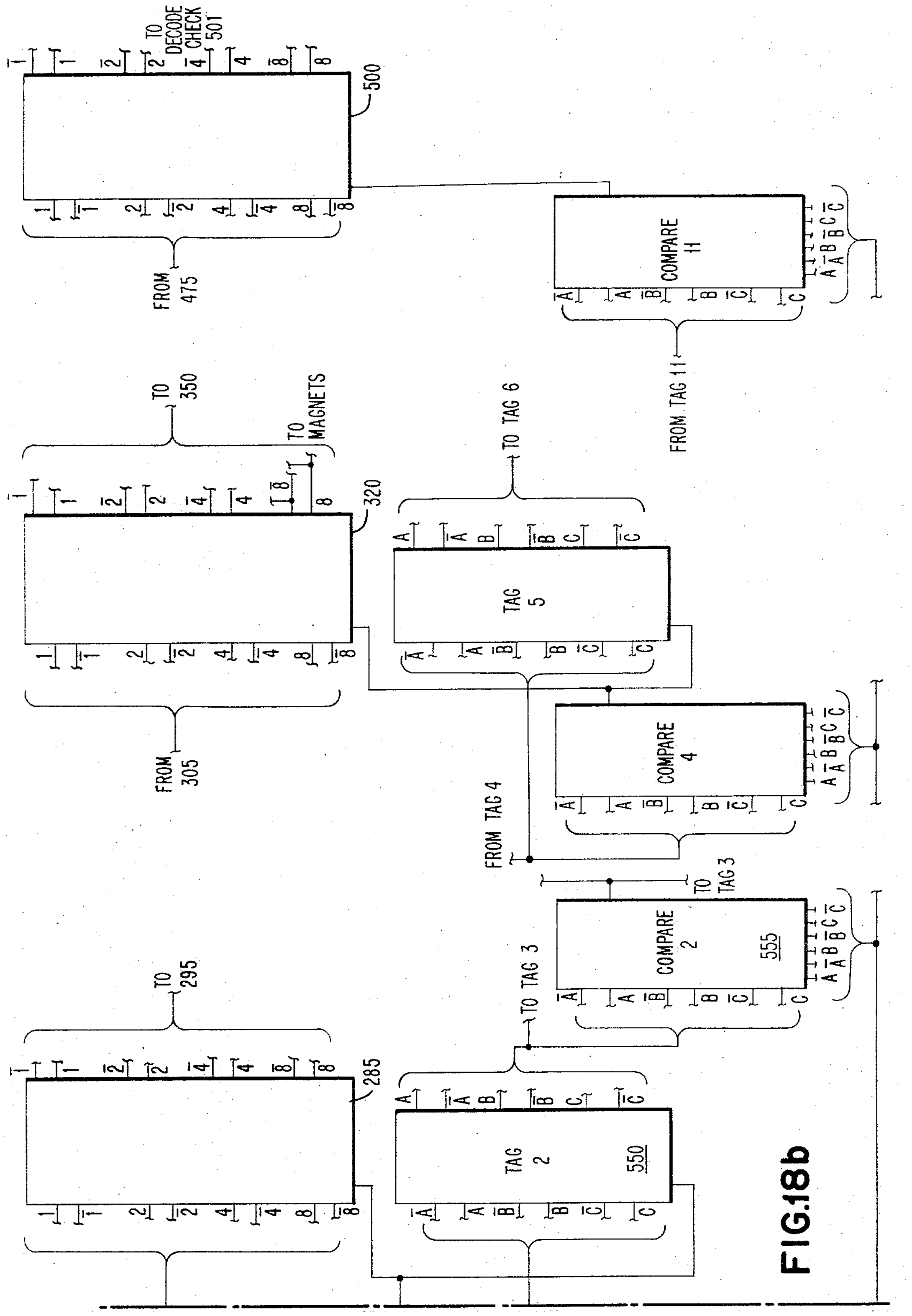

FIG. 5 is a schematic diagram illustrating how the bit positions of the registers for storing the document selection data can be eliminated if checking is not included, the 8 bit position for registers six to twelve inclusive can be eliminated if a check is not made to determine if the document is in the proper transport path; the 4 bit position for registers nine and ten can be eliminated and the 2 and 4 bit positions for register eleven and the entire register twelve can be eliminated if a check is not made to determine whether or not document properly entered pockets zero or twelve, which can be referred to as the reject pocket R;

FIG. 6 is a schematic diagram illustrating the decode circuit and magnet driver circuit connected to register six for controlling the selection of documents into pocket number one;

FIG. 7 is a schematic diagram symbolically illustrating the decode circuit and magnet driver circuit connected to register seven for controlling the selection of documents into pockets two and six;

FIG. 8 is a schematic diagram illustrating the decode circuit and magnet driver circuit connected to register eight for controlling the selection of documents into pockets three and seven;

FIG. 9 is a schematic diagram illustrating the decode circuit and magnet driver circuit connected to register nine for selecting documents into pockets four and eight;

FIG. 10 is a schematic diagram illustrating the decode circuit and magnet driver circuit connected to register ten for selecting documents into pockets five and nine;

FIG. 11 is a schematic diagram illustrating the decode circuit and magnet driver circuit connected to register eleven for selecting documents into pocket eleven;

FIG. 12 is a schematic diagram of the circuits for making a check to determine whether or not documents have properly entered pocket zero;

FIG. 13 is a schematic diagram showing the check circuit for determining whether or not documents have properly entered pocket twelve or the reject pocket R;

FIG. 14 is an isometric view showing in greater detail the apparatus for selecting documents into the pockets;

FIG. 15 is an isometric view showing the selection apparatus in greater detail for selecting documents into one of the two transport paths;

FIG. 16 is a schematic diagram illustrating a second embodiment of the invention which is adaptable to the document feeding and transport apparatus of FIG. 1;

FIG. 17 is a timing diagram for the second embodiment illustrated in FIG. 16 and, FIGS. 18*a* and 18*b* with FIG. 18*b* disposed to the right of FIG. 18*a* taken together illustrate a third embodiment of the invention.

With reference to the drawings and particularly to FIG. 1, there is shown a preferred embodiment of the invention. FIG. 1, as it will be seen shortly, is a preferred embodiment with regard to the control apparatus for controlling the operation of the first four registers for storing the document selection data.

Generally speaking, in this invention, the document selection data is a single character for identifying the pocket into which the associated document is to be selected. The single character is represented by a plurality of bits according to a code to be described later herein. However, the single character can represent a two digit number. In this example, there are twelve pockets into which the documents are selected. Further, while this invention is applicable to any transport configuration for transporting the documents to the pockets into which the documents are selected, the invention is shown for a machine having one bank of pockets disposed below another bank of pockets with six pockets in each bank. This particular configuration provides for a compact machine because the length of the machine is thereby shortened considerably.

In order to gain an appreciation for the invention, the feeding and transporting of documents will first be described. Documents 10 are supported upon a platform 11 and are fed from the top by a picker belt 12. The documents 10 can vary in length. The pocket pitch is fixed. It is equal to approximately ten inches in this example and is the distance from the pocket entry point of one pocket to the pocket entry point of the adjacent pocket. The minimal document cycle is defined as being equal to the maximum document length plus the minimum gap between documents and is greater than the pocket pitch. The minimum gap between documents is equal to the maximum allowable design slippage in the transport plus the maximum pick-up or drop-out time of each pocket select magnet and the magnets for operating the deflector for selecting the documents into one of two transport paths.

Documents 10 picked by belt 12 are advanced between belts 13 and 14, belt 14 funtcions as a restraint belt. Picker belt 12 is similar to belt 77 in U.S. Patent 2,989,307, dated June 20, 1961, for Sheet Feeding Apparatus, and belts 13 and 14 are similar in function to belts 88 and 89, respectively, in that patent. In fact, the document feed apparatus for this invention could be identical to that shown in Patent 2,989,307.

The documents 10 are then transported by series of feed rolls 20 to come under a magnetic writehead 25 which magnetizes characters printed upon the document in magnetic ink so that the characters can be subsequently read by magnetic readhead 26 so as to derive the document selection data from the documents. Of course, this is just one example of how the document selection data is read from a document. The document selection data could be read in coded form by optical means or in punch hole form by conventional sensing brushes and contact roll or various other forms well-known in the art. The source of the document selection data or pocket selection character and the use made thereof will be described later herein.

The leading edge of each document is detected by a document detector DD0 which is schematically shown as including a light source 30 and a light responsive element 31. The document detector DD0 has as one function to define a predetermined point A in the transport path. After the documents 10 pass relative to the document detector DD0, they are transported by a pair of continuous or endless belts 35 and 36. As the documents are transported between endless belts 35 and 36, the leading edge of each document is detected by a document detector DD1 which is located a predetermined distance downstream from detector DD0. Document detector DD1 consists of a light source 40 and a light responsive element 41. Document detector DD1 defines a predetermined point B in the transport path and, as will be seen later herein, functions to synchronize the transfer of the document selection data with the movement of the documents during the remaining portion of their travel.

In this particular example, a maximum number of four documents can be in the transport path between points A and B at any one time. The reason for this, as it will be seen in greater detail hereinafter, is that there are only four registers for storing the document selection data for that section of the transport path. Hence, if it is desirable to design a machine having a predetermined number of documents in a particular transport section, then there must be corresponding number of document selection data storage registers.

When the leading edge of the document 10 reaches point B, a decision is made for determining whether the document 10 will be directed to the upper or lower bank of pockets. It is sufficient at this time, to note that the decision is made by examining the document selection data or pocket selection character. The particular details as to how this is accomplished will be described hereinafter. A magnetically operated document deflector 50, which is shown in greater detail in FIG. 15, when in the position shown by the solid line, will direct documents to the upper bank of pockets whereas when it is moved to the position shown by the dashed lines, the documents are directed to travel to the lower bank of pockets.

If the documents are directed to the upper bank of pockets, they follow along the underside of endless belt 36 and are guided by guides not shown, to enter between the underside of endless belt 36 and a feed roll 60, there being a feed roll 60 on both sides of the endless belt 36. Document deflector 61 is normally positioned so as to permit the documents to pass on to feed roll 62. When a document is to be selected into pocket number one, document deflector 61 is actuated so as to be pivoted clockwise and thereby direct a document into the pocket one through the facility of cooperating feed rolls 65. The documents entering pocket one rest upon a vertically movable platform 70. Platform 70 is adapted to move downwardly as documents enter pocket one. The movement of platform 70 can be controlled similar to the movement of the platform shown in U.S. Patent 2,910,294, dated Oct. 27, 1959, for Air Regulated Movable Platform.

Documents enter pockets two, three, four and five under control of document deflectors 75, 80, 85, and 90 respectively. If a document is not selected into either pockets one, two, three, four or five, it will automatically be selected into pocket zero which is the last pocket of the upper bank of pockets. Points C, D, E, F and G in the transport path for the upper bank of pockets are associated with pockets one, two, three, four and five respectively.

When a document arrives at point C, a decision is made as to whether or not it is to be directed into pocket 1, similarly at point D a decision is made as to whether or not the document is to be directed into pocket 2, and decisions will be made at point E as to whether or not it is to be directed into pocket three, at point F to determine whether or not it is to be directed into pocket four, and at point G to determine whether or not it is to be directed into pocket five. Documents not selected into pockets one, two, three, four or five are automatically diverted into the zero pocket. A document detector DD2 which includes light source 95 and light responsive element 100 detects the leading edge of documents in the transport path for the upper bank of pockets when the leading edge arrives at point H in the transport path. The arrival of a document at this point is utilized for checking purposes as will be described in detail later herein.

When the leading edge of a document is at point C in the transport for the upper bank of pockets, the leading edge of that document, if it had not been selected into the transport for the upper bank of documents, would be at point I in the transport for transporting the documents to the lower bank of pockets. Endless belt 35 cooperates with endless belt 101 to transport the documents relative to the lower bank of pockets. The lower bank of pockets include pockets six, seven, eight, nine, eleven and twelve or the reject pocket R. Documents are deflected into pockets six, seven, eight, nine and eleven under control of document deflectors 105, 110, 115, 120 and 130 respectively. If a document is not selected into pockets six, seven, eight, nine or eleven, they will automatically be selected into the reject pocket R or twelve.

Points J, L, M and N in the transport for the lower bank of pockets are the points for making decisions as to whether or not documents should be selected into pockets six, seven, eight, nine and eleven respectively. A document detector DD3, which includes a light source 135 and a light responsive element 136 detects the leading edge of documents arriving at point P in the transport path for the lower bank of pockets. It will be seen later herein that document detector DD3 is utilized in the checking circuit for determining whether or not a document should have been directed to the reject pocket R or twelve.

Similar to the arrangement for the upper bank of pockets, there are feed rolls 145 disposed to either side of endless belt 100. The document transport path lengths are defined so that documents cannot be at positions J and D, K and E, L and F, M and G, and N and H simultaneously. The significance of this will be seen later herein; however, it may be noted at this time, that this arrangement permits time sharing of the control counters, the data storage registers, the decode circuits and the magnet drivers between the transport path for the upper and lower banks of pockets.

With the foregoing description of the document feeding and transport apparatus in mind, the document selection apparatus will be described. The document selection data or pocket selection character will either be carried by the documents 10 themselves or will come from a computer 200, FIG. 1, or like device.

The document selection data from computer 200 is assumed to be in binary coded decimal form. Several commercial computers have outputs in binary coded decimal form. It should be noted that the selection data is numeric. In this example, as previously indicated, there are twelve pockets and therefore the selection data or pocket selection characters will be the characters one through twelve. The code for the characters one through twelve is shown in FIG. 3.

This code varies from the binary coded decimal notation so that the upper bank of pockets each are identified by a one in the eight bit position of the code and the lower bank of pockets are each identified by a zero in the eight bit position of the code. Additionally, the values in the bit positions one, two and four for pockets two, three, four, five and zero, are identical to that for pockets six, seven, eight nine and eleven. It is thus seen that the eight bit position is utilized to determine whether the documents are selected into the transport path for the upper bank of pockets or to the transport path for the lower bank of pockets. Further, it is seen that the code permits sharing of the decode circuits which will be described later herein in detail. This is because once the document has been selected into the proper transport path, the data for selecting a document into pocket number two is identical to the data for selecting a document into pocket number six.

Hence, the pocket selection data from computer 200 is converted from the binary coded decimal form to the notation indicated in FIG. 3. This is accomplished by a code converter 210 which is simply illustrated by a block. The code converter 210 consists of logical AND and OR circuits for changing the binary coded decimal notation to that shown in FIG. 3. The design of the code converter 210 is within the scope of a person skilled in the art and therefore, details of the logical AND and OR circuits are not shown. Also, it should be noted, that bipolar outputs are used.

As previously indicated, the document selection data can be carried by the documents themselves and this document selection data is shown as being read from the documents 10 by readhead 26. Readhead 26 is a magnetic head and it is assumed in this example, that the document selection data is printed in magnetic ink. The document selection data read by magnetic head 26 is encoded into binary decimal form after having been amplified by amplifier 215. The encoding and code conversion apparatus is shown in block form by block 220. The data reading and encoding apparatus of the IBM 1412 Magnetic Character Reader or the IBM 1419 Magnetic Character Reader would be suitable. The encoded data in binary coded decimal form would then be converted in the same manner that the information in binary coded decimal form from computer 200 is converted. It should be noted that information in binary coded decimal form could be used directly without code conversion if it were desired to utilize a different notation for determining whether the document is to be selected into the upper or lower transport path or if it were desired to have a single transport path for the documents. The particular code chosen is merely for the purposes of explaining the invention and the invention can be embodied using any code for identifying the document selection data.

The document selection data is transferred to a single character buffer 225 from code converter 210 or from encode and code converter 220, via a plurality of logical OR circuits 230, only one logical OR circuit being shown for the eight bit position. The document selection character is transferred from buffer 225 to a first data register 240 under control of a signal developed by document detector DD0. Light responsive element 31 of document detector DD0 has its output connected to the input of an amplifier 32. The output of the amplifier is connected to the input of a single shot mulivibrator 33 which has its output connected to the register controls 250. The single shot multivibrator 33 functions to develop a gating impulse in response to the document detector DD0 detecting the leading edge of a document. The details of the register controls 250 are shown in FIG. 2*a*.

Figure 2A:
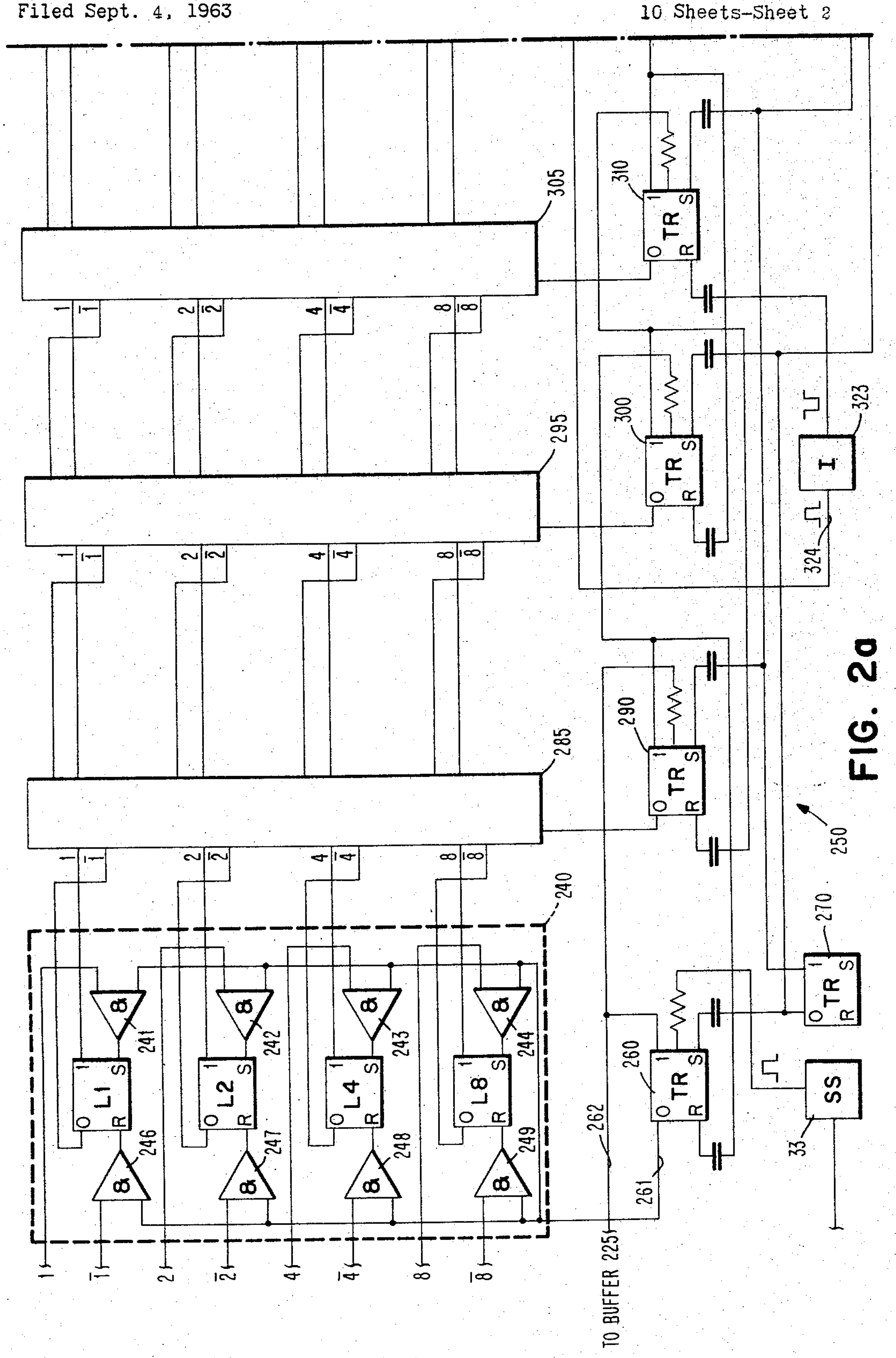

In FIG. 2*a*, register 240 consists of four latches, L1, L2, L4 and L8. Each latch has a set input terminal and a reset input terminal. The set terminals of latches L1, L2, L4 and L8 are connected to the outputs of logical AND cricuits 241, 242, 243 and 244 respectively. The reset terminals of latches L1, L2, L4 and L8 are connected to the outputs of logical AND circuits 246, 247, 248 and 249 respectively.

Logical AND circuits 241, 242, 243, 244, 246, 247, 248 and 249 are conditioned under control of a trigger 260. Trigger 260 is a gated AC set and reset type of trigger circuit. The output terminal of trigger 260 associated with the reset side thereof is connected by a conductor 261 to the inputs of logical AND circuits 241, 242, 243, 244, 246, 247, 248, and 249 to condition the same. Hence, when trigger 260 is in the reset state, data can be entered into register 240 because the logical AND circuits 241, 242, 243, 244, 246, 247, 248 and 249 will be conditioned. Trigger 260 is conditioned to be set by the single shot multivibrator 33 which, it will be recalled, provides an impulse when the document detector DD0 detects the leading edge of a document. Trigger 260 is set as a control trigger 270 switches from its set state to its reset state. Control trigger 270 which is also identified as trigger TX is switched by a photo electric emitter 275 which consists of a light source 276 and emitter disc 277 and a light responsive element 278. The emitter disc 277 is driven from the same shaft which drives the endless belt 36 (see FIG. 1), and in this example it has four arcuately spaced slots so as to generate eight electrical impulses in the time it takes for a document to travel one pocket pitch distance. The number of impulses generated within the time taken for a document to travel one pocket pitch distance can be varied depending upon the resolution desired. The trigger 270, FIGS. 1 and 2*a*, is switched in response to each electrical impulse generated by emitter 275. The light responsive element 278 of emitter 275 has its output connected to the input of an amplifier 279. The output of amplifier 279 is connected to the set and reset inputs of trigger 270.

Referring to FIG. 2*a*, it is seen that a character is entered into register 240 under control of trigger 260. Further it is seen that the character enters register 240 when trigger 260 is in its reset state. The pocket selection data is transferred from register 240 to register 285 under control of a trigger 290. Register 285 is shown only in block form, however it is identical to register 240. Trigger 290 is identical to trigger 260; however, it is conditioned to be set by the set output of trigger 260 and it is set when the control trigger 270 changes from its reset to its set state. The setting of trigger 290 causes the resetting of trigger 260. Likewise, it should be noted that when trigger 260 is set, it causes buffer 225 to be reset.

The document selection character or pocket selection character is transferred from register 285 to register 295 under control of a trigger 300. Likewise, the pocket selection character is transferred from register 295 to register 305 under control of a trigger 310. Registers 295 and 305 are also identical to register 240. Triggers 300 and 310 are identical to trigger 260.

Trigger 300 is conditioned to be set by trigger 290 and is connected to be set by trigger 270 when the same changes from its set state to its reset state. The set output of trigger 300 is connected to the reset terminal of trigger 290 so as to reset the same when trigger 300 is set. Trigger 300 permits the transfer of the pocket selection character from register 285 to 295 when trigger 300 is in the reset state.

Trigger 310 is conditioned to be set by trigger 300 and is set when control trigger 270 switches from its reset state to its set state. The setting of trigger 310 resets trigger 300 because the set output of trigger 310 is connected to the reset input of trigger 300. Trigger 310 permits the transfer of the pocket selection character from register 295 to register 305 when trigger 310 is in the reset state.

Before describing how trigger 310 is reset, a short summary will be given with regard to the purpose of the registers 240, 285, 295 and 305 and the manner in which the pocket selection character is transferred from register to register.

The registers 240, 285, 295 and 305 function to accept and store the pocket selection characters in sequence as documents 10 are fed in sequence but asynchronously. The pocket selection characters in this embodiment must be available for transfer from register 305 when the leading edge of the associated documents reach point B in the transport.

Let us assume that the first pocket select character is read from its associated document 10 and transferred to buyer 225. Further, assume that triggers 260, 290, 300 and 310 are all reset initially. Hence, registers 240, 285, 295 and 305 will be conditioned to accept the pocket selection character from buffer 225. When document detector DD0 detects the leading edge of document 10, single shot multivibrator 33 is switched to develop an impulse which conditions trigger 260 for being set. Trigger 260 will be set when trigger 270 switches from its set state to its reset state. Trigger 270 is constantly being switched from its set to its reset state and vice versa as emitter 275 generates electrical impulses. With trigger 260 switched to its set state, buffer 225 will be reset to zero. Additionally, trigger 290 will be conditioned to be set when trigger 270 switches from its reset state to its set state. When this occurs, trigger 290 will be set and the setting of trigger 290 will cause the resetting of trigger 260. With trigger 260 in its reset state, buffer 240 can accept the information from buffer 225. However, buffer 225 is reset at this time and consequently buffer 240 will be reset by buffer 225. It should be noted that the minimal document cycle is approximately equal to ten emitter pulses and therefore the second document will not be in sensing position at this time and a second pocket selection character will not be in buffer 225. With trigger 290 set, trigger 300 is conditioned to be set and it will be set when trigger 270 switches from its set state to its reset state. When this occurs, trigger 290 will be reset thereby permitting the data in register 240 to be transferred to register 285. However, register 240 is in its reset state, hence register 285 will be switched to its reset state. The reset state of register 240 is a condition when latches L1, L2, L4 and L8 are reset.

When trigger 300 is set, trigger 310 will be conditioned for setting. Trigger 310 will be set when it is conditioned for being set and trigger 270 is switching from its reset to its set state. The setting of trigger 310 causes trigger 300 to be reset. With trigger 300 reset, register 295 is conditioned to accept the data in register 285. Register 285 at this time is in its reset state and therefore, register 295 becomes reset. Hence, at this time, registers 240, 285 and 295 are reset and the pocket selection character for the first document 10 resides in register 305. The pocket selection character in register 305 will not be transferred therefrom to register 320, FIG. 2*b*, until register 320 is conditioned to accept the pocket selection character from register 305. Register 320, as it will be seen shortly, is conditioned to accept the pocket selection character from register 305 when the leading edge of the associated document 10 arrives at point B in the transport.

Before the leading edge of the first document 10 arrives at point B in the transport, there can be a maximum of four documents in the transport section between points A and B. Consequently, register 305 will contain the pocket selection character for the first document in the transport or the document furtherest downstream. Register 295 will contain the pocket selection character associated with the second document in the transport section between points A and B. Register 285 will contain the pocket selection character associated with the third document in the transport section between points A and B. Register 240 will contain the pocket selection character associated with the fourth document in the transport section between points A and B.

The second, third, and fourth pocket selection characters will enter the registers as follows. Since triggers 260, 290 and 300 are all reset, as just described, registers 240, 285 and 295 will be conditioned for accepting data. As the pocket selection character is read from the second document 10, it will enter buffer 225 and immediately the information will be transferred to buffers 240, 285 and 295. Since trigger 310 is still in its set state, information cannot enter buffer 305 so as to erase the information already therein. Additionally, when the leading edge of the second document 10 is detected by document detector DD0, the trigger 260 will be conditioned for being set and it will be set when trigger 270 changes from its set state to its reset state.

With trigger 260 set, buffer 225 is reset and trigger 290 is conditioned to be set. Trigger 290 becomes set when trigger 270 switches from its reset to its set state. With trigger 290 set, trigger 260 is reset and therefore register 240 is conditioned to accept the information from buffer 225 which is in its reset state, consequently register 240 becomes reset at this time. Further, with trigger 290 set, trigger 300 will be conditioned for being set and it will be set when trigger 270 switches from its set to its reset state. With trigger 300 set, trigger 290 is reset and register 285 is conditioned to accept the information from register 240. Register 240 at this time is in its reset state and therefore, register 285 becomes reset. It should be noted that trigger 260 becomes reset only during the transition or change of state of trigger 290 when it switches from its reset to its set state. Likewise, trigger 290 is reset by trigger 300 only when it switches from its reset to its set state and trigger 300 is reset when trigger 310 switches from its reset to its set state. Hence, although trigger 310 is in its set state, it was possible for trigger 300 to switch from its reset state to its set state and trigger 300 will remain in its set state because trigger 310 is not being switched. Additionally, with trigger 300 in its set state, trigger 310 will be conditioned for being set; however, since it is already in its set state, the switching of trigger 270 from its reset state to its set state will have no effect on trigger 310 at this time. Thus, it is seen that the pocket selection character for the first document 10 will be stored in register 305 and the pocket selection character for the second document 10 will be stored in register 295. Triggers 260 and 290 will be reset and registers 240 and 285 as well as buffer register 225 will be reset.

When the third document is in reading position, the pocket selection character associated with that document will be read therefrom and transferred to buffer 225. Since triggers 260 and 290 are reset at this time, the pocket selection character entering buffer 225 will also enter registers 240 and 285. When the leading edge of the third document is detected by document detector DD0, single shot multivibrator 33 is switched, thereby developing an impulse for conditioning the setting of trigger 260 and trigger 260 becomes set under this condition when trigger 270 switches from its set state to its reset state. As trigger 260 becomes set, buffer 225 is reset and trigger 290 is conditioned for being set. With trigger 290 being conditioned for being set, it will be set when trigger 270 switches from its reset state to its set state. As trigger 290 is set, trigger 260 is reset and therefore, register 240 is in condition to accept data from buffer 225 and since buffer 225 is reset, register 240 will be reset at this time. The conditions of the registers at this time are then that register 305 still contains the pocket selection character associated with the first document, register 295 contains the pocket selection character associated with the second document, register 285 contains the pocket selection character for the third document, register 240 is reset and buffer 225 is reset. Additionally, triggers 290, 300 and 310 are all in their set state while trigger 260 is in its reset state.

When the fourth document comes into reading position, the pocket selection character is read therefrom and transferred to buffer 225. Since trigger 260 is in its reset state at this time, the pocket selection character in buffer 225 is transferred to register 240. As the leading edge of the fourth document is detected by document detector DD0, an impulse is developed to switch singleshot multi-vibrator 33 which in turn develops an impulse for conditioning trigger 260. Trigger 260 under this condition is then set as trigger 270 switches from its set to its reset state. As trigger 260 becomes set, buffer 225 is reset. It is thus seen that registers 305, 295, 285 and 240 contain the pocket selection characters for documents one, two, three and four respectively and that triggers 310, 300, 290 and 260 are in their set condition at this time.

Figure 2B:
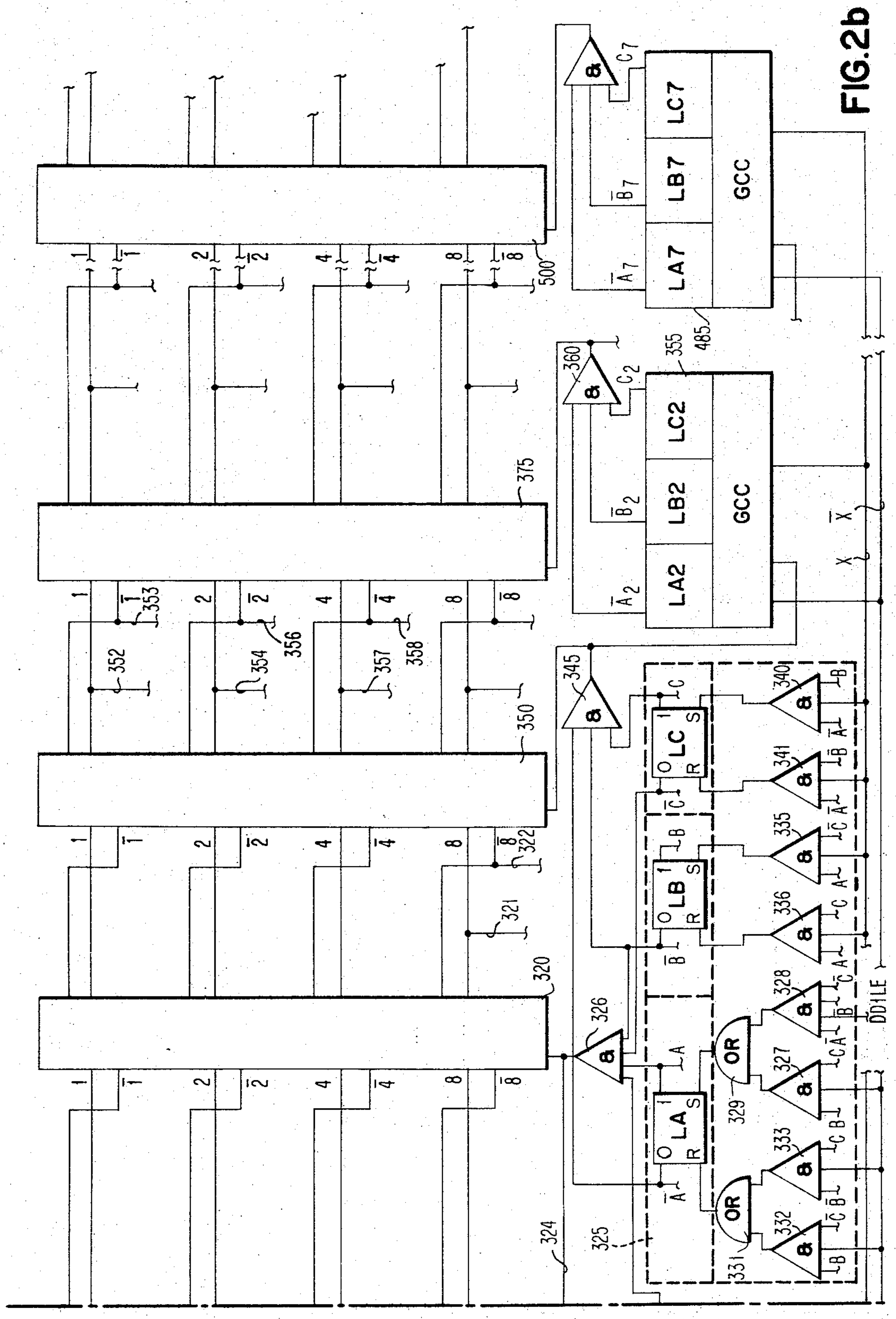

Under the conditions just mentioned, the first document, i.e., the one furtherest downstream, will be in a position whereby its leading edge will be detected by document detector DD1, FIG. 1. With reference to FIG. 2*b*, registers 320, 350, 370, 375 and 400 are all identical to each other and identical to register 240 of FIG. 2*a*. However, the registers 320, 350, 375 and 400 are conditioned by a counter rather than a trigger. The reason for this difference is that the pocket selection characters must be synchronized with the movement of the associated documents throughout the remaining portion of the transport system for the machine. For additional reliability, the counters for controlling the conditioning of registers 320, 350, 375 and 400 are gray code counters.

A gray code counter is a binary type counter where only one element of the counter undergoes a change in state at any one time. Additionally, the gray code counters in this example include three bistable elements for counting from zero to seven. Of course, other counters can be used. However, whatever type of counter is used, it should be remembered that data or the pocket selection character should be transferred from register 305 to register 320 when the leading edge of the document is detected by document detector DD1. Further, the pocket selection character in register 320 must be transferred to register 350 when the leading edge of the document reaches either point C, FIG. 1, in the transport section associated with the upper bank of documents or at point I in the transport section associated with the lower bank of pockets.

Likewise, the pocket selection character must be transferred from register 350 to register 375 when the leading edge of a document is either at point D or at point J in the transport path for the upper and lower banks of pockets respectively. Also, the pocket selection character must be transferred from register 375 to register 400 when the leading edge of a document is either at point E or at point K in the transport paths for the upper and lower bank of pockets respectively. In a like manner, the pocket selection character is transferred from register 400 to register 425 when the leading edge of a document is either at point F or L in the transport paths for the upper and lower bank of pockets. Similarly, the pocket selection character will transfer from register 425 to register 450 when the leading edge of a document is either at point G or M and from register 450 to 475 when the leading edge of a document is either at point H or N in the transport paths for the upper and lower bank of pockets. The pocket selection character will be transferred from register 475 to register 500 when the leading edge of a document arrives at point P on the transport path associated with the lower bank of pockets.

The registers 320, 350, 375, 400, 425, 450, 475 and 500 are all shown in FIG. 1. However, only register 320, 350, 375, and 500 are shown in FIG. 2*b*. From the foregoing, it will be appreciated that the distance from point B to point C or from point B to point I in the transport paths can be subdivided into as many increments as desired, depending upon the degree of resolution required by a machine or system. Again, in this example, the distance between points B and C and points B and I is divided into eight increments and this provides adequate resolution for the minimal document cycle.

Referring again to FIG. 2*b*, gray code counter 325 is shown in detail and it consists of latches LA, LB and LC which are interconnected to count according to the chart shown in FIG. 4. The operation of gray code counter 325 is under control of trigger 270 shown in FIGS. 1 and 2*a*. Additionally, to appreciate the operation of gray code counter 325, it should be noted that register 320 is conditioned to accept information from register 305 when there is an output from logical AND circuit 326. Logical AND circuit 326 has one input connected to the set output of trigger 310, FIG. 2*a*, an input connected to the set output of latch LA, FIG. 2*b*, an input connected to the reset output of latch LB, and an input connected to the reset output of latch LC. Under these conditions, there will be an output from logical AND circuit 326 to condition register 320 for accepting information from register 305 when trigger 310 is in its set state and latch LA is in its set state while latches LB and LC are in their reset state. Initially, latches LA, LB and LC are in their reset state.

Latch LA is settable under control of two logical AND circuits 327 and 328 respectively. The outputs of logical AND circuits 327, 328 are connected as inputs to a logical OR circuit 329 which has its output connected to the set terminal of latch LA. Logical AND circuit 327 has one input connected to the set output of trigger 270, FIG. 2*b*, another input connected to the set output of latch LB and another input connected to the set output of latch LC.

Logical AND circuit 328 has an input connected by a conductor 330 to the output of a singleshot multivibrator 43, shown in FIG. 1. The singleshot multivibrator 43 functions to develop an impulse indicating that the leading edge of a document has arrived in position to be detected by document detector DD1. In FIG. 1, the output of light responsive element 41 is connected to an amplifier 42 and its output is connected to the input of the singleshot multivibrator 43. Logical AND circuit 328 also has inputs connected to the reset output of latch LA, the reset output of latch LB and the reset output of latch LC respectively.

Hence, with reference to FIG. 2*b* and FIG. 4, gray code counter 325 will be forced to one, i.e., latch LA will be set and latches LB and LC will remain reset when the leading edge of a document is detected by document detector DD1 in FIG. 1. Thereafter, counting takes place as shown in FIG. 4. This is accomplished because of the following connections. The reset terminal of latch LA is connected to the output of a logical OR circuit 331 having inputs connected to the outputs of logical AND circuits 332 and 333 respectively. Logical AND circuit 332 has an input connected to a reset output of trigger 270, an input connected to the set output of latch LB and an input connected to the reset output of latch LC. Logical AND circuit 333 has an input connected to the reset output of trigger 270, an input connected to the reset output of latch LB, and an input connected to the set output of latch LC.

The set input terminal of latch LB is connected to the output of a logical AND circuit 335. Logical AND circuit 335 has an input connected to the set output of trigger 270, an input connected to the set output of latch LA and an input connected to the reset output of latch LC. The reset input terminal of latch LB is connected to the output of a logical AND circuit 336. Logical AND circuit 336 has an input connected to the set output of trigger 270, an input connected to the set output of latch LA and an input connected to the set output of latch LC.

Latch LC has its set input terminal connected to the output of a logical AND circuit 340. Logical AND circuit 340 has an input connected to the set output of trigger 270, an input connected to the reset output of latch LA and an input connected to the set output of latch LB. The reset input terminal of latch LC is connected to the output of a logical AND circuit 341. Logical AND circuit 341 has an input connected to the set output of trigger 270, an input connected to the reset output of latch LA, and an input connected to the reset output of latch LB.

Gray code counter 325 operates as follows. Initially, latches LA, LB and LC of gray code counter 325 are in the reset state. When the leading edge of the document is detected by document detector DD1, FIG. 1, latch LA, FIG. 2*b*, is set because the conditions of logical AND circuit 328 will be satisfied, and an impulse will be passed via logical OR circuit 329 to the set terminal of latch LA. Thus latch LA is set and when control trigger 270 changes from the zero state or reset state to the one or set state, latch LB will be set because the conditions of logical AND circuit 335 will be satisfied; namely, there will be an input signal from the set output of latch LA, there will be an input signal from the reset output of latch LC and there will be a signal as trigger 270 changes from its reset state to its set state.

With reference to FIG. 4, it is seen that with latches LA and LB in their set state, and latch LC in its reset state, this is indicative of the gray code counter 325 having reached a count of two. As trigger 270 switches from its set state to its reset state, latch LA will be reset because the conditions of logical AND circuit 332 will be met and a signal will be passed via logical OR circuit 331 to the reset terminal of latch LA. When trigger 270 switches again from its reset state to its set state, latch LC will be set, because the conditions of logical AND circuit 340 will be satisfied and a signal will be passed to the set terminal of latch LC.

With latches LB and LC set and latch LA reset, this is indicative that gray code counter 325 has reached a count of four. Again, when the trigger 270 switches from its set state to its reset state, latch LA will again be set but this time via logical AND circuit 327 and logical OR circuit 329. With latches LA, LB and LC set, this is indicative that the gray code counter 325 has reached a count of five.

Likewise, when the trigger 270 again switches from its reset to its set state, latch LB will be reset because the condition for passing a signal will be met for logical AND circuit 336. With latch LA set, latch LB reset and latch LC set, this is indicative that gray code counter 325 has reached a count of six. When trigger 270 again switches from its set to its reset state, latch LA will again be reset but this time through the facility of logical AND circuit 333 and logical OR circuit 331. Under these conditions, gray code counter 325 will have reached a count indicative of seven. Upon gray code counter 325 reaching seven, the pocket selection character in register 320 will be transferred to register 350. This is accomplished by means of a logical AND circuit 345 which has its inputs connected to counter 325 and its output connected to condition register 350. Logical AND circuit 345 has an input connected to the reset output of latch LA, an input connected to the reset output of latch LB and an input connected to the set output of latch LC. Consequently, when gray code counter 325 reaches seven, the conditions of the inputs to logical AND circuit 345 will be satisfied because latches LA and LB will be in their reset state at this time, and latch LC will be in its set state. The output of logical AND circuit 345 is connected to the input for controlling the setting of latch LA2 of gray code counter 355. Gray code counter 355 is identical to the apparatus of gray code counter 325 and therefore, it is shown schematically. Gray code counter 355 counts in a manner similar to or like gray code counter 325.

When gray code counter 355 reaches a value of seven, the inputs to a logical AND circuit 360 will be satisfied and register 375 will be conditioned to accept the pocket selection character from register 350 because the output of logical AND circuit 360 is connected to condition register 375. Further, see FIGS. 1 and 2*b*, the output of logical AND circuit 360 is connected to set gray code counter 415 to one. Gray code counter 415 is identical to gray code counter 355 and when it reaches a value of seven, it conditions register 400 so that the same can receive the pocket selection character from register 375. Additionally, gray code counter 415, upon reaching the value of seven, sets gray code counter 420 to the value of one.

When gray code counter 420 reaches a value of seven, it conditions register 425 to enable the same to receive the pocket selection character from register 400. Additionally, when gray code counter 420 reaches a value of seven, it forces gray code counter 445 to the value of one. When gray code counter 445 reaches the value of seven, it conditions register 450 to accept the pocket selection character from register 425 and additionally, sets gray code counter 465 to the value of one. When gray code counter 465 reaches a value of seven, it conditions register 475 to accept the pocket selection character from register 450 and it also sets the gray code 485 to one. Upon gray code counter 485 reaching the value of seven, it conditions register 500 to accept the pocket selection character from register 475.

From the foregoing, it is thus seen how registers 320, 350, 375, 400, 425, 450, 475, and 500 are conditioned to accept the pocket selection characters. The following discussion will now describe how the pocket selection character is transferred from register 305, FIG. 2*a*, to register 320, FIG. 2*b*. When the inputs to logical AND circuit 326, FIG. 2*b*, are satisfied, there will be a signal on conductor 324 which is connected to the output of logical AND circuit 326, FIG. 2*b*, and to the input of an inverter 323 in FIG. 2*a*. The output of the inverter 323 is connected to the reset terminal of trigger 310. It will be recalled that the inputs to logical AND circuit 326, FIG. 2*b*, are satisfied when gray code counter 325 has reached a value of one, that is latch LA is set and latches LB and LC are reset. However, in order to permit the pocket selection character to transfer from register 305, FIG. 2*a*, to register 320, FIG. 2*b*, it is necessary that trigger 310 be permited to stay in its set state until the transfer has been accomplished. Inverter 323, FIG. 2*a*, permits the transfer to take place prior to the resetting of trigger 310.

The input impulse to inverter 323 is a positive going impulse; however, the output impulse on the inverter 323 first goes negative and then remains negative for a period of time to permit the transfer of data from register 305, FIG. 2*a*, to register 320, FIG. 2*b*, and then goes positive and upon going positive, the trigger 310, FIG. 2*a*, is reset. Hence, it is seen that the pocket selection character in register 305 is thus transferred to register 320.

Additionally, with trigger 310 reset, register 305 will be conditioned to accept the pocket selection character from register 295. It should also be noted that the pocket selection character transferred from register 305 to register 320 will remain in register 320 until gray code counter 325 reaches a value of seven. Of course, while the gray code counter 325 is counting to seven, the trigger 270, FIG. 2*a*, is switching back and forth as emiter 275 generates impulses. This also means that the trigger 310 will again be set because it will still be conditioned by trigger 300 being in its set state and therefore, when trigger 270 switches from its reset to its set state, trigger 310 will be set.

The setting of trigger 310 causes the resetting of trigger 300. With trigger 300 reset, the pocket selection character in register 285 will be transferred to register 295. However, it will be recalled that trigger 290 is still in its set state and therefore, trigger 300 will be conditioned to be set as trigger 270 switches from its set state to the reset state. As trigger 300 switches from its reset to its set state, trigger 290 is reset, thereby conditioning register 285 to accept the pocket selection character from register 240. Trigger 290 will be conditioned to be set because trigger 260 is still in its set state and therefore, as trigger 270 switches from its reset to its set state, trigger 290 will be set. As trigger 290 is set, trigger 260 will be reset and therefore, register 240 will be in condition to accept a pocket selection character from buffer 225.

To summarize, at this time, the pocket selection character associated with the first document 10 is now stored in register 320, the pocket selection character for the second document is in register 305, the pocket selection character for the third document is in register 295, the pocket selection character for the fourth document is in register 285, and register 240 is in its reset state ready to receive the pocket selection character for the fifth document after the pocket selection character for that document enters buffer 225. Hence, from the foregoing, it is seen that the pocket selection characters will advance in sequence from buffer 225 to register 240 to register 285 to register 295 to register 305 and to register 320, etc. and that registers 240, 285, 295 and 305 are able to store the pocket selection character until the first document arrives at point B in the transport path. Further, it is seen that the pocket selection characters will be transferred in sequence and in time with the progression of the documents as the same are transported in the transport paths for the upper and lower banks of pockets.

The function of register 320 is to store the pocket selection during the period of time that the document associated with that pocket selection character is travelling from point B to either point C or I, and additionally, the pocket selection character while stored in register 320 is examined to determine whether the associated document should be diverted to the transport path for the upper bank of pockets or to the transport path for the lower bank of pockets. This is possible because the transfer of data from register 305 to register 320 takes place substantially instantaneously as the document arrives at point B in the transport and therefore, there is adequate time to make a decision as to which transport path the document should be diverted into by means of document deflector 50.

As indicated above, only the eight bit position in register 320 is examined to determine into which path the document is to be diverted or directed. A conductor 322, FIG. 2*b*, is connected to the set output of the eight bit position latch in register 320, the latch not being shown, and a conductor 321 is connected to the reset output of this latch. The conductor 322 is connected to a magnet driver 319, FIG. 1, which has its output connected to a solenoid S1, while the conductor 321 is connected to the input of the magnet driver 318 which has its output connected to the solenoid S2.

The solenoids S1 and S2 function to operate the document deflector 50, as seen in detail in FIG. 15. The document deflector 50 is fixed to a shaft 44 which is suitably journaled for rotation. A bar 45 is fixed intermediate of its ends to the one end of shaft 44. The core of solenoid S1 is attached by means of a link 46 to the bar 45 near one end thereof while the core of solenoid S2 is attached by a link 47 to the bar 45 near the other end thereof. Solenoid S1 when energized rotates the bar 45 counter clockwise thereby rotating shaft 44 counter clockwise to move the document deflector 50 to the position shown in full line in FIG. 15. With the document deflector 50 in this position, the documents 10 will be diverted to the transport path for the upper bank of pockets.

Hence, whenever there is a one bit in the eight bit position for the pocket selection character in register 320, the document deflector 50 will be positioned by the solenoid S1 to the position shown in full line in FIG. 15, and therefore, documents will be diverted to the transport path for the upper bank of pockets. By referring to FIG. 3, it is seen that there is a one bit in the eight bit position for pocket selection characters one through five and zero. Pockets one through five and zero constitute the upper bank of pockets.

Conversely, when there is a zero bit in the eight bit position of the pocket selection character in register 320, then the solenoid S2 will be energized whereby bar 45 will be rotated clockwise thus rotating shaft 44 clockwise to move document deflectors inwardly into the grooves 48 of roller 49. With the document deflector moved into the grooves 48, documents 10 will be directed into the transport path for the lower bank of pockets. Again with reference to FIG. 3, it is seen that pocket selection characters six to nine inclusive and eleven and twelve each have a zero bit in the eight bit position. Pockets six through nine and eleven and twelve form the lower bank of pockets.

Register 350, FIGS. 1 and 2*b*, receives the pocket selection character from register 320 at the time the leading edge of a document is either at point C in the transport path for the upper bank of pockets or at point I in the transport path for the lower bank of pockets. This transfer was described above. The pocket selection character while in register 350 is analyzed by a decode network 351, FIGS. 1 and 6, to determine whether or not the document is to be directed into pocket number one. The details of decode network 351 are shown in FIG. 6. In FIG. 6, conductors 352, 353, 354, 356, 357 and 358 are connected to the set and reset outputs of latches for the bit positions one, two and four in register 350 respectively. A conductor 359 is connected to a negative voltage through a resistor R, to conductor 352 by a diode D1, to conductor 354 by a diode D2, and to a conductor 357 by a diode D3. The diodes D1, D2, D3 and the resistor R form a logical AND circuit which will have an output when there is an input on conductors 352, 354, and 357. The output is taken from conductor 359 and is fed into a magnet driver 360. Magnet driver 360 includes transistors T1 and T2 which are grounded emitter NPN transistors. Conductor 359 is connected to the base of transistor T1 through a resistor R1. The base of transistor T1 is also connected to a plus voltage through a resistor R2. The collector of transistor T1 is connected to a plus voltage through a resistor R3. The collector of transistor T1 is also connected to the base of transistor T2. The collector of transistor T2 is connected to a magnet M1 which is connected between the collector of transistor T2 and a plus voltage. The magnet M1 operates the document deflector 61 for directing documents into pocket one as shown in FIG. 1. The magnets for operating the document deflectors for the other pockets as well as the associated magnet drivers are identical. Hence, the details for the other magnet drivers will not be shown.

FIG. 14 shows the structure in detail of the document deflector for directing documents into a pocket. It will be assumed that the apparatus shown in FIG. 14 is for pocket number one and that the apparatus for the other pockets is similar or the same. The document deflectors 61 are mounted on a shaft 66, which is suitably journaled for rotation. A bar 67 is attached at one of its ends to one end of the shaft 66. The core of the magnet or solenoid M1 is attached to the bar 67 intermediately of its ends. The other end of the bar 67 is attached to one end of a spring 68 which has its other end attached to a fixed member 69. When the magnet M1 is de-energized, spring 68 holds the document deflector 61 in a down position so that the documents can pass thereover. When the magnet M1 is energized, the bar 67 will be rotated clockwise, thereby rotating shaft 66 clockwise and the deflector 61 will be raised to the position shown by the dotted line. With the deflector 61 in this position, documents 10 will be directed into the opening between deck plates 71 and 72 to enter between rollers 65 and thereby be directed into pocket number one to reside upon platform 70. The document deflectors 61 will be returned to their normal position by spring 68 when magnet M1 is de-energized. Magnet M1 will become de-energized only when the pocket selection character in register 350 is other than a one.

It will be recalled that document 10 cannot be simultaneously at points D and J and therefore, a single decode network 376, FIGS. 1 and 7, can be used for examining the pocket selection character in register 375 for determining whether the documents are to be directed into pocket two or six. It will be further recalled that the document associated with the pocket selection character in register 375 will have been directed into the proper transport path at the time the associated pocket selection character was residing in register 320. The decode network 376 is shown simply as a logical AND circuit in FIG. 7, which has inputs from the reset output of the one bit position latch in register 375, from the set output of the two bit position latch and from the set output of the four bit position latch. The output of logical AND circuit 376 is connected to the input of magnet driver 377. The magnet driver 377 is substantially the same as magnet driver 360. The output of magnet driver 377 is connected to parallel connected magnets M2 and M6 which are also connected to a positive voltage. Since magnets M2 and M6 are simultaneously energized, the document deflectors 75 and 105 will be operated simultaneously. However, this creates no problem because documents will not be simultaneously at points D and J. Hence, it is seen that whenever there is a pocket selection character two or six in register 375, logical AND circuit 376 will pass a signal to magnet driver 377 which will then energize magnets M2 and M6.

In FIG. 8, the decode network connected to register 400 is shown as a logical AND circuit 401 having an input connected to the set output of the one bit position latch in register 400 and input connected to the reset output of the two bit position latch in that register and an input connected to the set output of the four bit position latch in that register. The output of logical AND circuit 401 is connected to the input of the magnet driver 402, which has its output connected to magnets M3 and M7, which are connected in parallel and to a positive voltage. With reference to FIG. 3 and FIG. 8, it is seen that whenever there is either a pocket selection character three or seven in register 400, logical AND circuit 401 will pass a signal to magnet driver 402 because the input lines to logical AND circuit 401 will be satisfied. Consequently magnets M3 and M7 will be energized and the document deflectors 80 and 110 shown in FIG. 1 will be operated to direct documents into either pocket 3 or 7. Of course, documents will not be simultaneously at points E and K and therefore there will be no problem with regard to directing the proper document into the proper pocket. Additionally, since the decision for placing the document in the proper transport path was made when the pocket selection character was in register 320, the document will be in the proper transport path.

In FIG. 9, the decode network connected to register 425 is shown as logical AND circuit 426 which has an input connected to the reset output of the one bit position latch in register 425, an input connected to the reset output of the two bit position latch in that register, and an input connected to the set output of the four bit position latch in that register. The output of logical AND circuit 426 is connected to the input of a magnet driver 427 which has its output connected to magnets M4 and M8 which are connected in parallel to a plus voltage. Consequently, it is seen that logical AND circuit 426 will pass a signal to magnet driver 427 which in turn will energize magnets M4 and M8 whenever there is either a pocket selection four or eight in register 425. Magnets M4 and M8 operate document deflectors 85 and 115 respectively. Again, documents will not be present simultaneously at points F and L in the transport paths and no conflict is created.

The decode network connected to register 450 is shown as logical AND circuit 451 in FIG. 10. Logical AND circuit 451 has an input from the set output of the one bit position latch in register 450, an input from the set output of the two bit position latch in that register and an input from the reset output of the four bit position latch in that register. The output of logical AND circuit 451 is connected to the input of a magnet driver 452 which has its output connected to magnets M5 and M9 which are connected in parallel into a positive voltage. Logical AND circuit 451 will pass a signal to magnet driver 452 whenever there is either a pocket selection character five or nine in register 450. Under these conditions, magnets M5 and M9 will be energized simultaneously to operate document deflectors 90 and 120 respectively. Simultaneous operation of deflectors 90 and 120 creates no problem because there will not be documents simultaneously at points G and F in the transport paths. Hence, documents can be selected into either pocket five or nine without any conflict.

The decode network connected to register 475 is shown as a logical AND circuit 476 in FIG. 11. Logical AND circuit has an input connected to the reset output of the one bit position latch in register 475, an input connected to the set output of the two bit position latch of the same register and an input connected to the reset output of the four bit position latch in the same register. The output of logical AND circuit 476 is connected to the input of a magnet driver 477 which has its output connected to a magnet M11. Magnet M11 is also connected to a plus voltage. Hence, whenever a pocket selection character eleven is entered into register 475, logical AND circuit 476 will pass an impulse to magnet driver 477 which in turn will energize magnet M11. Magnet M11 controls document deflector 130 shown in FIG. 1.

It should be noted that a document deflector is not required to direct documents into pocket zero because it is the last pocket in the upper bank of pockets and therefore, if a document has not been directed to any of the other pockets in the upper bank of pockets, it will automatically be directed into pocket zero. However, for checking purposes, the pocket selection character in register 475 is examined to determine whether or not it is a zero, a pocket selection character zero is the same as the character eleven except for the eight bit position. Hence, a decode network 478 is also connected to register 475.

The decode network 478 is shown in detail in FIG. 12. A conductor 479 connected to a minus voltage through a resistor R is also connected by a diode D10 to a conductor connected to the reset output of the one bit position latch of register 475. Conductor 479 is also connected by a diode D11 to the set output of the two bit position latch in register 475, by a diode D12 to the reset output of the four bit position in register 475 and by a diode D13 to the set output of the eight bit position latch in register 475. The output of the decode network 478 is connected to the input of an inverter 481 which consists of a grounded emitter NPN transistor T3. The output of the inverter 481 is taken from the collector of transistor T3 and is connected to a diode D14 of a logical AND circuit 482. Logical AND circuit 482 also has an input which is representative of the fact that the leading edge of a document has been detected by document detector DD2. The output of document detector DD2 is connected to the input of an amplifier 483 which has its output connected to a singleshot multivibrator 484. The output of singleshot multivibrator 484 is connected to diode D15 of the logical AND circuit 482. The output of logical AND circuit 482 is connected to a terminal 486 which is connectable to the stop circuits of the machine, not shown. It is thus seen that the machine will be stopped, or other indications could be provided, when there is a pocket selection character other than zero in register 11 and a document is being detected by document detector DD2. Of course, if there is a zero in register 475 at the time a document is detected by document detector DD2, there will be no output from logical AND circuit 482 and the machine will continue to run.

Register 500 functions to store a pocket selection character so that a check can be made to determine whether or not a document has properly entered pocket twelve or the reject pocket R. In FIG. 13, the decode network 501 is shown as a logical AND circuit having an input connected to the set output of the one bit position latch in register 500, an input connected to the reset output of the two bit position latch in the same register, an input connected to the reset output of the four bit position latch in the same register, and an input connected to the reset output of the eight bit position latch of that same register. The output of logical AND circuit 501 is connected to the input of an inverter 502 which has its output connected to an input of a logical AND circuit 503. Logical AND circuit 503 has another input connected to the output of a singleshot multivibrator 505. The singleshot multivibrator 505 functions to develop a signal when the document detector DD3 has detected the leading edge of a document. The input to the singleshot multivibrator 505 is connected to the output of an amplifier 506 which has its input connected to the output of document detector DD3. In view of the inverter 502 connected to the logical AND circuit 503, there will be an output from logical AND circuit 503 only when a pocket selection character in register 500 is other than a twelve. When this occurs, a signal will appear at terminal 504 which is connected between the output of logical AND circuit 503 and the stop circuits of the machine. Documents are automatically directed into pocket twelve and a selectively operable document deflector is not required because if the documents have not entered any of the pockets in the lower bank of pockets, then they will automatically enter pocket twelve.

From the foregoing, it is seen that documents are fed by picker belt 12 and transported to the read station. The pocket selection character is read from the document at the read station by magnetic head 26 and transferred to buffer 225. It is also possible that the pocket selection character can come from computer 200 and enter buffer 225. Document detector DD0 detects the leading edge of a document as the same passes from the read station and it functions to develop a signal which is utilized in connection with the control of register 240. The pocket selection character in buffer 225 is transferred to registers 240, 285, 295 and 305 simultaneously. The registers 240, 285 and 295 are subsequently reset and the pocket selection character resides in register 305 until the leading edge of the associated document is detected by document detector DD1. When this occurs, the pocket selection character is transferred from register 305 to register 320. The pocket selection character in register 320 is examined whereby the document deflector 50 is properly positioned to direct the associated document into the proper transport path. For example, assume that a pocket selection character is a one and when the document is detected by document detector DD1, the one is transferred from register 305 to register 320 and since there is a one bit in the eight bit position for a character one, then a signal will flow from the latch for the eight bit position of register 320 to magnet driver 329 whereby solenoid S1 becomes energized to move the document deflector to the position as shown in full line in FIG. 15 so that when the document is transported between belts 35 and 36 around roller 49, the document will enter into the transport path for the upper bank of pockets.

During the time that the document is travelling from point B to point C, gray code counter 325 will be counting from one to seven and it will reach the count of seven when the leading edge of the document is at point C whereby the pocket selection character one in register 320 is then transferred to register 350. The pocket selection character one now in register 350 will be decoded by the decode network 351 and since a one is represented by a one bit, a two bit and a four bit, there will be a signal on the output of the decode network 321 whereby magnet driver 360 will be activated to energize magnet M1 which in turn will operate document deflector 61 so as to cause the same to rotate clockwise whereby the document will be deflected into the bite between rollers 65 and into pocket 1 to reside upon platform 70.

Although the document associated with the pocket selection character one has entered into pocket number 1, the pocket selection character one will be transferred from register 350 to register 375 when gray code counter 355 reaches a count of seven. Likewise, the pocket selection character one will be transferred from register 375 to register 400 when gray code counter 415 reaches a count of seven and from register 400 to register 425 when gray code counter 420 reaches a count of seven and from register 425 to register 450 when gray code counter 445 reaches a count of seven and from register 450 to register 475 when gray code counter 465 reaches a count of seven and from register 475 to register 500 when gray code counter 485 reaches a count of seven.

The pocket selection character one as it is transferred from register to register, will also be examined by the decode network associated with the particular register. However, since the pocket selection character will not satisfy the decode networks associated with the other registers, the associated magnet drivers and magnets will not be energized and consequently neither will the document deflectors be operated. Additionally, a signal will not be passed by either logical AND circuit 482 or 503 because neither document detector DD2 nor document detector DD3 will develop an output since they have not detected the leading edge of a document at this time. Therefore, the machine will continue to operate.

The first embodiment of the invention is a preferred embodiment because registers 240, 285, 295 and 305 together with the controls generally designated as 250 in FIG. 1 require a minimal amount of apparatus. The second embodiment of the invention utilizes the same transport as does the first embodiment; however, the document detector DD1 is no longer required because, as it will be seen shortly, synchronism is established at the outset by document detector DD0 whereas this was not the situation for the first embodiment of the invention. Also, the second embodiment of the invention does not require the buffer 225. However, the second embodiment requires more apparatus than the first embodiment because of the controls for the registers for storing the pocket selection characters. The second embodiment of the invention is shown in FIG. 16 and the registers 240, 285, 295, 305, 320, 350, 375, 400, 425, 450, 475 and 500 of the first embodiment are also used in the second embodiment. Hence, since buffer 225 is not required, the output of logical OR circuit 230 is connected as input to logical AND circuit 244. It will be recalled that logical OR circuit 230 is connected to receive the eight bit and that there would be a logical OR circuit for each bit position of the register 240. The major difference between the first and second embodiments of the invention lies in the control over the registers.

The pocket selection character, as in the first embodiment, can be derived from the documents themselves or from the computer. The pocket selection character enters register 240 under control of a signal developed by the document detector DD0. However, in this instance, the signal is taken directly from amplifier 32. Hence, register 240 will be conditioned to receive a character during the entire time that a document is being detected by document detector DD0. However, the transfer of data from register 240 to register 285 is synchronized with the movement of the document. This is accomplished by setting gray code counter 241 to the count of one upon the document detector DD0 detecting the leading edge of a document. Gray code counter 241 is similar in structure to gray code counter 325 of the first embodiment, i.e., it consists of three latches which are interconnected so as to count from zero through seven with only one latch changing state at any one time. The advance pulses are derived from trigger 270. When gray code counter 241 reaches a count of seven, logical AND circuit 242 will be conditioned and gray code counter 286 will be set to one whereby register 285 will be conditioned to accept the pocket selection character from register 240.

In connection with the second embodiment of the invention, it may be summarized that the pocket selection character enters register 240 any time during the time that gray code counter 241 is counting from one to seven and thereafter, the pocket selection character is transferred from register to register in synchronism with the movement of the associated document. FIG. 16 only shows registers 1, 2, 5 and 12 for purposes of simplicity. It should be noted that there is a gray code counter for controlling the entry of data into each register by means of a logical AND circuit which is connected to the outputs of the latches of the gray code counter so as to have an output when the particular gray code counter reaches a count of seven. Hence, the inputs to logical AND circuit 287 are connected to the reset output of latch A, to the reset output of latch B, and to the set output of lach C of gray code counter 286. The output of logical AND circuit 287 is connected to the gray code counter, not shown in FIG. 16, for controlling the transfer of data from register 295, also not shown in FIG. 16, and to the register 295 so as to condition the same for receiving the pocket selection character from register 285. The decode networks, magnet drivers and checking circuits are the same for the second embodiment as for the first embodiment and therefore, they are not shown for a second time.

The second embodiment can be explained in connection with a timing diagram. FIG. 17 is a timing diagram showing the flow of data from register to register under action of the gray code counters. In FIG. 17 it is assumed that the first document is destined for pocket number one, the second document is destined for pocket number six and the third document is destined for pocket number eight. As previously indicated, the pocket selection character for the first document can enter register 240 at any time that the document is under document detector DD0. However, gray code counter 241 is set to one when the leading edge of the first document is detected by document detector DD0. Gray code counter 241 is then advanced as trigger 270 switches state in response to being set and reset by electrical impulses from emitter 275. The pocket selection character one will remain in register 240 until a new pocket selection character is entered therein. However, the pocket selection character one will be transferred to register 285 when gray code counter 241 reaches a count of seven. It should be remembered that the transfer of a character from one register to the next adjacent register does not destroy the setting of the register from which the character is transferred. Therefore, the character remains in the transferred from register until a new pocket selection character is entered therein. Gray code counter 241 counts from seven to zero and then remains at zero until the leading edge of the next document is detected by document detector DD0 because this is the only condition under which gray code counter 241 can be set to one.

Similarly, gray code counter 286 is set to one when gray code counter 241 reaches seven. Upon gray code counter 286 reaching a count of seven, the pocket selection character one will be transferred from register 285 to register 295. Additionally, upon gray code counter 286 reaching a count of seven, gray code counter 296 will be set to one. The pocket selection character one will remain in register 295 until gray code counter 296 reaches a count of seven. The pocket selection character is then transferred from register 295 to register 305 as gray code counter 296 reaches seven and gray code counter 306 is set to one. When gray code counter 306 reaches a count of seven, the pocket selection character one in register 305 is transferred to register 320 and gray code counter 325 is set to one. It should be noted that gray code counter 325 is also used in the first embodiment. However, it is also usable in the second embodiment, but when so used, the inputs to logical AND circuit 328, FIG. 2*a*, are changed. Conductor 330 is deleted and replaced by a conductor, not shown, from gray code counter 306 which is indicative of a condition that gray code counter 306 has reached a count of seven.

The eight bit position of the pocket selection character one is examined while it is in register 320 to determine the operation of document deflector 50. The pocket selection character one is subsequently transferred from register 320 to register 350 when gray code counter 325 reaches a count of seven and gray code counter 355 is thus set to one. With the pocket selection character one in register 350, the decode circuit 351 will pass a signal to magnet driver 360, thereby energizing magnet M1 which in turn will operate document deflector 61 to direct document number one into pocket one.

When gray code counter 355 reaches a count of seven, the pocket selection character one is register 350 will be transferred to register 375 and gray code counter 355 will be set to one. It will be recalled that although a document has been selected into a pocket, the associated pocket selection character will be transferred from register to register until it reaches register 500. The setting of the register is changed only by a new character entering the register. The document deflectors for the other pockets will not be operated as the pocket selection character advances from register 350 to the remaining registers because the decoding circuits for the remaining registers will not pass a signal to activate the associated magnets.

The second document is destined for pocket six and the pocket selection character six is entered into register 240 any time during the interval that gray code counter 241 is counting from one to seven. Gray code counter 241 is set to one when the leading edge of the second document is detected by document detector DD0. Gray code counter 241 had been set from the count of seven to the count of zero and it remains at the count of zero until the leading edge of the second document has been detected by document detector DD0. The pocket selection character six associated with the second document will be advanced from register to register similarly to the advancement of the pocket selection character one which was previously described and when pocket selection character six enters register 375 it will be decoded so as to activate magnets M2 and M6 which in turn will operate document deflectors 75 and 105. However, the second document will be directed to pocket number six because document deflector 50 was switched to a position to direct the documents to the transport path for the lower bank of pockets when the pocket selection character six resided in register 320.

Likewise, the pocket selection character eight for the third document will enter register 240 during the interval while gray code counter 241 is counting from one to seven and thereafter will be transferred from register to register. When pocket selection character eight for document three enters register 320, document deflector 50 will remain in the same position as it was for the second document because the third document is also to be directed to the transport path for the lower bank of pockets. When pocket selection character eight enters register 425, it will be decoded so as to energize magnets M4 and M8, thereby operating document deflectors 85 and 115 and hence, the third document will be directed into pocket eight.

The third embodiment of the invention is shown in FIGS. 18*a* and 18*b*. Those elements in the third embodiment of the invention which are substantially identical to the elements for the first and second embodiments of the invention will be given like reference characters. Generally speaking, in the third embodiment of the invention, a single gray code counter is used to generate a sequence of discrete emitter numbers as impulses are emitted by emitter 275. The pocket selection character is entered into register 240 in the same manner as for the second embodiment of the invention. Synchronization is accomplished by document detector DD0 and document detector DD1 is not required. The transport configuration is substantially the same as that for the second embodiment of the invention.

The emitter numbers developed by gray code counter 510 are the numbers zero through seven to represent the eight unique states of the gray code counter 510. When the leading edge of the first document 10 is detected by the document detector DD0, singleshot multivibrator 33 develops an impulse for gating the outputs of gray code counter 510 at that time into a tag register 520. The outputs of gray code counter 510 at any one time represent a discrete emitter number.

Tag register 520 consists of three bistable latches L1, L2 and L4. Logical AND circuits 521, 522, 523, 524, 525 and 526 are respectively connected to the outputs of the gray code counter 510 so as to be able to store the value of gray code counter 510 at the time there is impulse from singleshot multivibrator 33 which has its output connected to condition the just mentioned logical AND circuits.

The outputs from the latches L1, L2 and L4 of tag store register 520 are continuously compared with the outputs from the gray code counter 510 by means of a compare circuit 540. Compare circuit 540 consists of diodes and resistors connected to form logical AND and OR circuits. Diodes DA1 and DL1 are connected to form a logical AND circuit for comparing the set output of latch LAE of gray code counter 510 with the set output of latch L1 of register 520. The output of the logical AND circuit formed by diodes DA1 and DL1 is connected to a diode DOL1 which forms a logical OR circuit in combination with diode DOL2. Diode DOL2 has an input from a logical AND circuit formed by diodes DA2 and DL2 which functions to compare the reset output of latch LAE with the reset output of latch L1. Similarly, diodes DB1 and DL3 form a logical AND circuit to compare the set outputs of latches LBE and L2 of gray code counter 510 and register 520 respectively. The output of the logical AND circuit so formed is connected to a diode DOL3 which forms a logical OR circuit with diode DOL4. Diode DOL4 has an input from the output of the logical AND circuit formed by diodes DB2 and DL4. The logical AND circuit so formed functions to compare the reset output of latch LBE with the reset output of latch L2 of gray code counter 510 and register 520 respectively. Diodes DC1 and DL5 form a logical AND circuit to compare the set output of latch LCE of gray code counter 510 with the set output of latch L4 of tag register 520. The output of the logical AND circuit so formed is connected to a diode DOL5 which forms a logical OR circuit with diode DOL6. Diode DOL6 is connected to the output of a logical AND circuit formed by diode DC2 and diode DL6 which functions to compare the reset output of latch LCE of gray code counter 510 with the reset output of latch L4 of register 520. The output of the logical OR circuit formed by diodes DOL1 and DOL2 is connected to a diode DL7 which forms a logical AND circuit with diodes DL8 and DL9. Diode DL8 is connected to the logical OR circuit formed by diodes DOL3 and DOL4 while diode DL9 is connected to the output of the logical OR circuit formed by diodes DOL5 and DOL6. The logical AND circuit formed by diodes DL7 and DL8 and DL9 has its output connected to gate the pocket selection character from register 240 to register 285 and to gate the emitter number in tag register 520 to tag register 550. The emitter number in tag register 550 is then compared with the output of gray code counter 510 by means of a compare circuit 555. When there is comparison between the emitter number in tag register 550 and that from gray code counter 510, the compare circuit 555 develops a signal whereby the pocket selection character in register 285 is transferred to register 295, not shown in FIG. 18*b*, and the emitter number in tag register 550 is transferred to an adjacent tag register, not shown, for storing the emitter number from tag register 550. By this arrangement, the pocket selection character is transferred from register to register in synchronism with the movement of associated documents. The decode circuits, magnet drivers and magnets are the same for the third embodiment as for the first and second embodiments of the invention and therefore are not shown.

From the foregoing, it is seen that the invention provides document selection apparatus operable by a document selection character which is caused to track or move in synchronism with the associated document as it is transported. Further, while the invention is not restricted to document sorting apparatus which has two parallel banks of pockets, the invention is adaptable to such an arrangement. Additionally, when the document sorting apparatus includes two parallel transport paths, the invention provides for time sharing of the control apparatus for one path with that of the second path and this can be accomplished even though the path lengths are different. For example, if one transport path is longer than the other by a length which can be expressed in terms of pocket pitch, this difference can then be compensated for by gating the outputs of the decode circuits with a value which corresponds to the difference in length expressed in terms of pocket pitch. This value or gating signal will be provided by the counters for controlling the transfer of the pocket selection character. Further, from the foregoing it is seen that the invention provides apparatus for checking to determine whether or not the documents were properly selected into the receiving receptacle or pockets.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Document sorting apparatus comprising:
(a) a plurality of document receiving receptacles,
(b) means for conveying documents sequentially along a predetermined path and relative to said document receiving receptacles,
(c) a plurality of data storage registers for storing data identifying the receptacles into which the documents are to be distributed,
(d) means for entering said identifying data into at least one of said registers,
(e) means operating in synchronism with the movement of said document conveying means for transferring said identifying data from storage register to storage register to track the movement of said documents with the identifying data as the same pass relative to said receiving receptacles,
(f) means for examining the identifying data in said registers as documents arrive at predetermined positions in said predetermined path, and
(g) means operative by said examining means for directing documents from said predetermined path into said receiving receptacles.

2. The document sorting apparatus of claim 1, wherein the identifying data is derived from the documents.

3. The document sorting apparatus of claim 1 wherein the identifying data is derived from a data source external of said documents.

4. Document sorting apparatus comprising:
(a) a plurality of document receiving receptacles,
(b) means for conveying documents in seriatim along a predetermined path and relative to said receptacles,
(c) a document reading station disposed in said predetermined path for deriving from the documents data identifying the receptacles into which the documents are to be distributed,
(d) a plurality of data storage registers for storing said identifying data,
(e) means for entering said identifying data from said document reading station into a first register of said plurality of registers,
(f) means operating in synchronism with the movement of said document conveying means for transferring said identifying data from storage register to storage register to storage register to track the movement of said documents with said identifying data as the same move along said predetermined path from said reading station and relative to said receptacles,
(g) means for examining said identifying data in said registers as documents arrive at predetermined positions in said predetermined path, and
(h) means operative by said examining means for directing documents from said predetermined path into said receiving receptacles.

5. Document sorting apparatus comprising:
(a) first, second and third predetermined document paths,
(b) means for transporting documents along said first, second and third document paths,
(c) a plurality of document receptacles disposed adjacent to said second and third predetermined paths,
(d) a first plurality of data storage registers for storing data identifying the receptacles into which the documents are to be distributed while being transported in said first document path, (e) a second plurality of data storage registers for storing data identifying the receptacles into which documents are to be distributed while being transported in said second and third document paths,
(f) means for entering said identifying data into said first plurality of data storage registers whereby the identifying data first entered therein will be first available therefrom,
(g) means for transferring said identifying data first available from said first plurality of storage registers to the first register of said second plurality of registers upon the associated document reaching a predetermined point in said first transport path,
(h) means for determining when said associated document has reached said predetermined point in said first transport path,
(i) means responsive to the identifying data in said first register of said second plurality of registers for directing the associated document from said first document path into said second or third document path depending upon said identifying data,
(j) means operable in synchronism with movement of said document transporting means for transferring said identifying data from register to register of said second plurality of registers as documents reach predetermined positions in said second and third document paths,
(k) means for examining the identifying data in said second plurality of registers as documents reach said predetermined positions in said second and third document paths, and
(l) means operative by said examining means for directing documents from said second and third document paths into said receptacles disposed adjacent thereto.

6. The document sorting apparatus of claim 5 whereby said means for entering identifying data into said first plurality of registers first enters the same identifying data into all registers thereof and second resets all registers except one and then repeatedly enters data and resets all of the remaining registers except one until each register of said first plurality of registers contains identifying data for an associated document.

7. The document sorting apparatus of claim 5 wherein said second plurality of registers and said examining means are shared between said second and third document paths.

8. The document sorting aparatus of claim 5 wherein the second and third document paths are arranged so that documents arrive at said predetermined positions in said second path at a different time than the time of arrival of documents at the predetermined positions in said third path.

9. Document sorting apparatus comprising:
(a) first, second and third document paths,
(b) means for transporting documents along said first, second and third paths,
(c) a plurality of receptacles disposed adjacent to said second and third predetermined paths,
(d) a first plurality of data storage registers for storing data identifying the receptacles into which documents are to be distributed while being transported in said first path,
(e) a second plurality of data registers for storing identifying data while documents are being transported in said second and third paths,
(f) means for entering said identifying data into said first plurality of registers whereby the identifying data first entered therein will be first available therefrom,
(g) means for transferring said identifying data first available from said first plurality of storage registers to the first register of said second plurality of registers upon the associated document reaching a predetermined point in said first transport path,
(h) means for determining when said associated document has reached said predetermined point in said first transport path,
(i) means responsive to the identifying data in said first register of said second plurality of registers for diverting the associated document from said first document path into said second or third document path depending upon said identifying data,
(j) means operable in synchronism with movement of said document transporting means for transferring said identifying data from register to register of said second plurality of registers as documents reach predetermined positions in said second document path,
(k) means operable in synchronism with movement of said document transporting means for transferring said identifying data from register to register of said second plurality of registers as documents reach predetermined positions in said third document path,
(l) first means for examining the identifying data in said second plurality of registers as documents reach said predetermined positions in said second document path,
(m) second means for examining the identifying data in said second plurality of registers as documents reach said predetermined positions in said third document path,
(n) means operative in response to said first examining means for diverting documents from said second document path into said receptacles disposed adjacent thereto, and
(o) means operative in response to said second examining means for diverting documents from said third document path into said receptacle disposed adjacent thereto.

10. Document sorting apparatus comprising:
(a) a predetermined document transport path,
(b) a plurality of document receptacles arranged in a series and adjacent to at least a portion of said path,
(c) means for conveying documents in seriatim along said path,
(d) a plurality of selectively operable document deflectors one for each receptacle for selectively diverting documents from said document path into said receptacles,
(e) an emitter operated in synchronism with said conveying means for generating electrical impulses,
(f) a counter connected to be advanced by said emitter, said counter having discrete outputs for representing discrete positions of said emitter,
(g) a plurality of tag registers for storing discrete emitter numbers from said counter,
(h) a plurality of gates connected to control the entry of emitter numbers into said tag registers,
(i) a document detector positioned at a discrete point in said path for generating a gating impulse upon detecting the leading edge of a document,
(j) means connecting the outputs of said counter to the gate for the first tag register of said plurality of tag registers whereupon the emitter number represented by the counter at the time the gate is conditioned enters said first tag register,
(k) means connecting said document detector to said gate for said first tag register to condition the same upon said document detector detecting the leading edge of a document,
(l) a plurality of data storage registers for storing data identifying the receptacle into which a document is to be selected,
(m) a plurality of gates for controlling the entry of identifying data into said storage registers,
(n) means for entering identifying data into the first data storage register of said plurality of data storage registers during the time there is an output from said document detector, (o) a plurality of compare circuits connected to said tag registers and to said counter to generate a gating signal when the emitter number in said tag register and the value of said counter are equal, (p) means connecting the output of said compare circuits to the gates for said tag registers and said data storage registers to condition the same for passing the emitter numbers and identifying data into the associated registers when said compare circuit develops said gating signal, and (q) means for examining the identifying data in said data registers and connected to selectively operate said document deflectors.

11. In an arrangement of apparatus for sorting documents into a plurality of receptacles by selectively operable document deflectors as the documents are transported in a predetermined document path, (a) a document detector discretely positioned in said transport path for generating a control signal upon detecting the leading edge of a document, (b) a plurality of registers for storing data identifying the receptacles into which documents are to be diverted, (c) a plurality of gates having outputs connected to the inputs of said plurality of registers to control the entry of data therein, (d) means connecting the outputs of said registers to inputs of said gates whereby upon any one gate being conditioned the information in the register having its output connected to the input of said one gate will be transferred to the register having its input connected to the output of said one gate, (e) means for entering said identifying data into the first register of said plurality of registers during the interval prior to conditioning of the gate for controlling entry of data into the second register of said plurality of registers, (f) means for conditioning said gates in sequence at predetermined time intervals related to movement of said documents, and (g) means for examining the identifying data in said registers, said examining means being connected to operate said selectively operable document deflectors.

12. The arrangement of apparatus of claim 11 wherein said conditioning means comprises:

(a) an emitter for generating electrical impulses in a time relationship with the movement of said documeans along said document path, (b) a plurality of counters having inputs and outputs, (c) a plurality of gates having outputs connected to the inputs of said plurality of counters for setting said counters in an initial condition, (d) means connecting said document detector to the input of the gate for setting the first counter of said plurality of counters in said initial condition upon said document detector detecting the leading edge of a document, (e) means connecting the outputs of said counters to the other gates of said plurality of gates, and (f) means connecting said emitter to the inputs of said counters whereby said counters are advanced after having been set to said initial condition.

13. The apparatus of claim 12 wherein said counters are gray code counters.

14. The apparatus of claim 12 wherein said emitter comprises:

(a) a light source, (b) a light sensitive element fixed in a spaced relationship with said light source, (c) a rotatable disc disposed relative to said lamp and light source to intermittently direct light from said light source onto said light sensitive devices as said disc is rotated, and (d) means for rotating said disc in synchronism with the movement of said documents.

References Cited

UNITED STATES PATENTS

| | | | |
|---|---|---|---|
| 3,068,451 | 12/1962 | Bolander | 340—194 |
| 3,069,012 | 12/1962 | Johnston | 209—110 |
| 3,141,540 | 7/1964 | Burkhardt | 198—38 |

DARYL W. COOK, *Acting Primary Examiner.*

R. COUNCIL, *Assistant Examiner.*